(12) United States Patent
Sugimura et al.

(10) Patent No.: US 7,450,816 B2
(45) Date of Patent: Nov. 11, 2008

(54) DIGITAL SIGNAL RECORDING AND REPRODUCTION APPARATUS SUITABLE FOR RECORDING AND REPRODUCING A COMPRESSED VIDEO SIGNAL

(75) Inventors: Naozumi Sugimura, Yokohama (JP); Hiroo Okamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1173 days.

(21) Appl. No.: 10/347,588

(22) Filed: Jan. 22, 2003

(65) Prior Publication Data

US 2003/0103763 A1 Jun. 5, 2003

Related U.S. Application Data

(63) Continuation of application No. 09/690,999, filed on Oct. 18, 2000, now Pat. No. 6,519,411, which is a continuation of application No. 08/810,092, filed on Mar. 4, 1997, now Pat. No. 6,175,683.

(30) Foreign Application Priority Data

Mar. 5, 1996 (JP) .................... 8-047079

(51) Int. Cl.
*H04N 5/91* (2006.01)
(52) U.S. Cl. .......................... 386/68; 386/95
(58) Field of Classification Search ................ 386/65, 386/68, 95
See application file for complete search history.

(56) References Cited

U.S. PATENT DOCUMENTS

| 5,396,497 A | 3/1995 | Veltman .................... 348/423 |
| 5,404,249 A | 4/1995 | Seki |
| 5,521,922 A | 5/1996 | Fujinami et al. ............. 348/423 |
| 5,565,923 A | 10/1996 | Zdepski ....................... 348/423 |
| 5,566,174 A | 10/1996 | Sato et al. ................... 348/423 |
| 5,598,352 A | 1/1997 | Rosenau et al. ............. 348/423 |
| 5,793,927 A | 8/1998 | Lane ............................ 386/81 |
| 5,859,949 A | 1/1999 | Yanagihara .................. 386/68 |
| 5,878,010 A | 3/1999 | Okamoto et al. |
| 6,011,899 A | 1/2000 | Ohishi et al. |

(Continued)

FOREIGN PATENT DOCUMENTS

JP 5-174496 7/1993

(Continued)

*Primary Examiner*—John W. Miller
*Assistant Examiner*—James A Fletcher
(74) *Attorney, Agent, or Firm*—Antonelli, Terry, Stout & Kraus, LLP.

(57) ABSTRACT

A digital signal recording apparatus for recording in blocks on a recording medium an input digital signal in the form of a plurality of input packets. Each of the input packets has a predetermined number of bytes. A first time stamp has been added to each of the input packets in advance for indicating a time of transmission of the input packet. A time stamp generator generates a second time stamp having a different format than the first time stamp added to each of the input packets in advance. A time stamp adding circuit removes the first time stamp added to each of the input packets in advance and adds the second time stamp to each of the input packets. A recording signal processor generates a recording signal in blocks from the input digital signal with the second time stamp added to each of the input packets.

8 Claims, 18 Drawing Sheets

U.S. PATENT DOCUMENTS

| | | |
|---|---|---|
| 6,041,161 A | 3/2000 | Okamoto et al. |
| 6,046,872 A | 4/2000 | Okamoto et al. |
| 6,163,644 A | 12/2000 | Owashi et al. |
| 6,175,683 B1 | 1/2001 | Sugimura et al. ............. 386/95 |
| 6,201,654 B1 | 3/2001 | Okamoto et al. |
| 6,321,025 B1 | 11/2001 | Owashi et al. |
| 6,400,888 B1 * | 6/2002 | Eerenberg et al. ............. 386/68 |

FOREIGN PATENT DOCUMENTS

| | | |
|---|---|---|
| JP | 9-139914 | 5/1997 |

* cited by examiner

DIGITAL SIGNAL RECORDING AND REPRODUCTION APPARATUS SUITABLE FOR RECORDING AND REPRODUCING A COMPRESSED VIDEO SIGNAL

CROSS-REFERENCES TO RELATED APPLICATIONS

This application is a continuation of application Ser. No. 09/690,999 filed on Oct. 18, 2000 now U.S. Pat. No. 6,519,411, which is a continuation of application Ser. No. 08/810,092 filed on Mar. 4, 1997, now U.S. Pat. No. 6,175,683. The contents of application Ser. Nos. 09/690,999 and 08/810,092 are hereby incorporated herein by reference in their entirety.

This invention relates to the following U.S. patent applications which are assigned to the same assignee as the present application.

U.S. patent application Ser. No. 08/518,579 filed on Aug. 15, 1995, in the names of Hiroo Okamoto, Hitoaki Owashi, Takaharu Noguchi, and Kyoichi Hosokawa and entitled "Method and Apparatus for Recording Digital Signal", now U.S. Pat. No. 5,878,010, the contents of which are hereby incorporated herein by reference in their entirety. U.S. patent application Ser. No. 09/207,915 filed on Dec. 9, 1998, now U.S. Pat. No. 6,046,872, is a continuation of U.S. patent application Ser. No. 08/518,579. U.S. patent application Ser. No. 09/468,822 filed on Dec. 22, 1999, now U.S. Pat. No. 6,201,654, is a continuation of U.S. patent application Ser. No. 09/207,915.

U.S. patent application Ser. No. 08/547,662 filed on Oct. 24, 1995, in the names of Hiroo Okamoto, Kyoichi Hosokawa, Hitoaki Owashi, Hiroaki Tachibana, and Takaharu Noguchi and entitled "Input-Output Circuit, Recording Apparatus and Reproduction Apparatus for Digital Video Signal", now abandoned, the contents of which are hereby incorporated herein by reference in their entirety. U.S. patent application Ser. No. 08/972,457 filed on Nov. 18, 1997, now U.S. Pat. No. 6,041,161, is a division of U.S. patent application Ser. No. 08/547,662. U.S. patent application Ser. No. 09/455,413 filed on Dec. 6, 1999, is a division of U.S. patent application Ser. No. 08/972,457.

U.S. patent application Ser. No. 08/637,101 filed on Apr. 24, 1996, in the names of Hitoaki Owashi, Hiroo Okamoto, Kyoichi Hosokawa, and Takaharu Noguchi and entitled "Method and Apparatus for Receiving and/or Reproducing Digital Signal", now U.S. Pat. No. 6,163,644, the contents of which are hereby incorporated herein by reference in their entirety. U.S. patent application Ser. No. 09/479,074 filed on Jan. 7, 2000, now U.S. Pat. No. 6,321,025, is a continuation of U.S. patent application Ser. No. 08/637,101. U.S. patent application Ser. No. 09/893,983 filed on Jun. 29, 2001, is a continuation of U.S. patent application Ser. No. 09/479,074.

BACKGROUND OF THE INVENTION

The present invention relates a digital signal recording and reproduction apparatus for recording and reproducing a digital signal, or more in particular to a recording and reproduction apparatus suitable for recording and reproducing a digital compressed video signal.

In recent years, digitization of the broadcasting has been under way.

The use of the digital image compression technique has made it possible to transmit a plurality of programs at the same time in a frequency band that has conventionally been able to transmit only one program. In the digital image compression, the data format of the packets to be transmitted is predetermined. Data are transmitted, for example, in packets of 188 bytes.

On the other hand, standardization of the specification of the digital VCR (video cassette recorder) for recording the digital broadcasting is under way. In the case where the digital VCR is used, a program can be recorded and reproduced in digital form and image can be stored with high quality.

For example, JP-A-5-174496 discloses a digital signal recording and reproduction apparatus for recording a digital compressed video signal on a magnetic tape using a rotary magnetic heads.

SUMMARY OF THE INVENTION

In the above-mentioned digital VCR, although the format for recording on the magnetic tape is determined as a standard, the contents of the data to be recorded are not specified.

A digital broadcast receiving apparatus for receiving the digital broadcasting varies from one broadcasting station to another, and there are several types of interfaces connecting to the VCR. The same digital image compression scheme is often used with different additional information such as time information or time stamps.

The time stamp indicates the time interval at which packets are sent for transmitting or storing digital signals. Even in the case of a delay occurring during transfer, the correct packet intervals can be determined by adding the time stamp.

The intervals at which packets of the digital compressed video signal input from a digital broadcast receiving apparatus are transferred is not constant and have a temporal gap. In the case where this signal is recorded directly, there occurs on the recording medium an area where no data is recorded. In order to increase the recording capacity of the recording medium and save waste, packets are desirably recorded closely in packed state. In the case where the packets ate recorded in packed state, however, data cannot be output in reproduction mode at the same timing as in recording mode unless the record includes information on the intervals at which the packets have been transferred. Also, even in the case where the packets are recorded loosely without packing, data are recorded in predetermined recording areas and therefore positions of the packets input are temporally displaced, thus making it difficult to output the reproduced data at exactly the same timing as at the time of recording.

In the case where data in the form of packets are recorded and reproduced by a recording and reproduction apparatus such as the VCR, a time stamp is added and recorded together with the packet data in advance and the packet output timing is regulated with reference to the time stamp at the time of reproduction. In this way, the packet data can be output at the same timing as at the time of recording.

As described above, in the case of recording and reproducing packet data by a recording and reproduction apparatus, addition of the time stamp is essential.

As an actual interface that has so far been conceived includes the one in which packet data in digital compressed signal of 188 bytes, for example, are transferred directly. In this system, the input signal contains no time stamp, and therefore a time stamp is added and recorded in the VCR in accordance with the timing at which the packets are input.

The VCR desirably records the time stamp in synchronism with the recording track position. For example, a reference signal is set to 27 MHz, the position on the recording track is expressed with 18 bits, and the recording track position is expressed with 8 bits, so that a total of 26 bits of information are added as a time stamp to the packets for recording. In this way, the position at which the packet data reproduced are located on the recording track can be determined, thereby facilitating the processing of the reproduced signal and variable-speed reproduction.

An interface has been conceived, on the other hand, in which a time stamp of 20 bits generated by a reference clock of 27 MHz is added to the digital compressed video signal of 188 bytes to transfer data. Assume that data are sent using this interface. Since the time stamp is added to the input packet in advance, the timing at which the packets are output can be adjusted on the basis of the time stamp at the time of reproduction, as long as the data are recorded in the recording medium together with the time stamp. Also, in view of the fact that the time stamp added in advance is used, the VCR is not required to generate a time stamp and therefore no error is caused in the time stamp.

In the recording operations performed with equipment having different interfaces as described above, however, the difference in the format of time stamps causes different formats of data to be recorded on the tape, often leading to the loss of tape compatibility.

An object of the present invention is to provide a digital signal recording and reproduction apparatus which provides compatibility among recording media each recorded using a different digital broadcast receiving apparatus or makes possible reproduction from a recording medium recorded using a different digital broadcast apparatus.

According to one aspect of the invention, there is provided a digital signal recording and reproduction apparatus for recording digital signals on a recording medium in blocks together with a time stamp added to each packet for indicating the time of transmission of the packet having a predetermined number of bytes, comprising a reference signal generating means for generating a reference signal in synchronism with the input digital video signal, a time stamp generating means for generating a time stamp on the basis of the reference signal, a time stamp adding means for adding the time stamp generated by the time stamp generating means to the input digital video signal in place of the time stamp previously added thereto, a recording signal processing means for generating a recording signal in blocks from the digital signal, and a recording means for recording the recording signal in the recording medium.

According to another aspect of the invention, there is provided a digital signal recording and reproduction apparatus for recording digital signals on a recording medium in blocks together with a time stamp added to each packet for indicating the time of transmission of the packet having a predetermined number of bytes, comprising a reference signal generating means for generating a reference signal in synchronism with the input digital video signal, a time stamp generating means for generating a time stamp on the basis of the reference signal, a time stamp adding means for adding the time stamp generated by the time stamp generating means to the input digital video signal, a recording signal processing means for generating a recording signal in blocks from the digital signal, and a recording means for recording the recording signal on a recording medium.

DESCRIPTION OF THE PREFERRED EMBODIMENTS

Embodiments of the invention will be described below with reference to the accompanying drawings.

Figure 1:
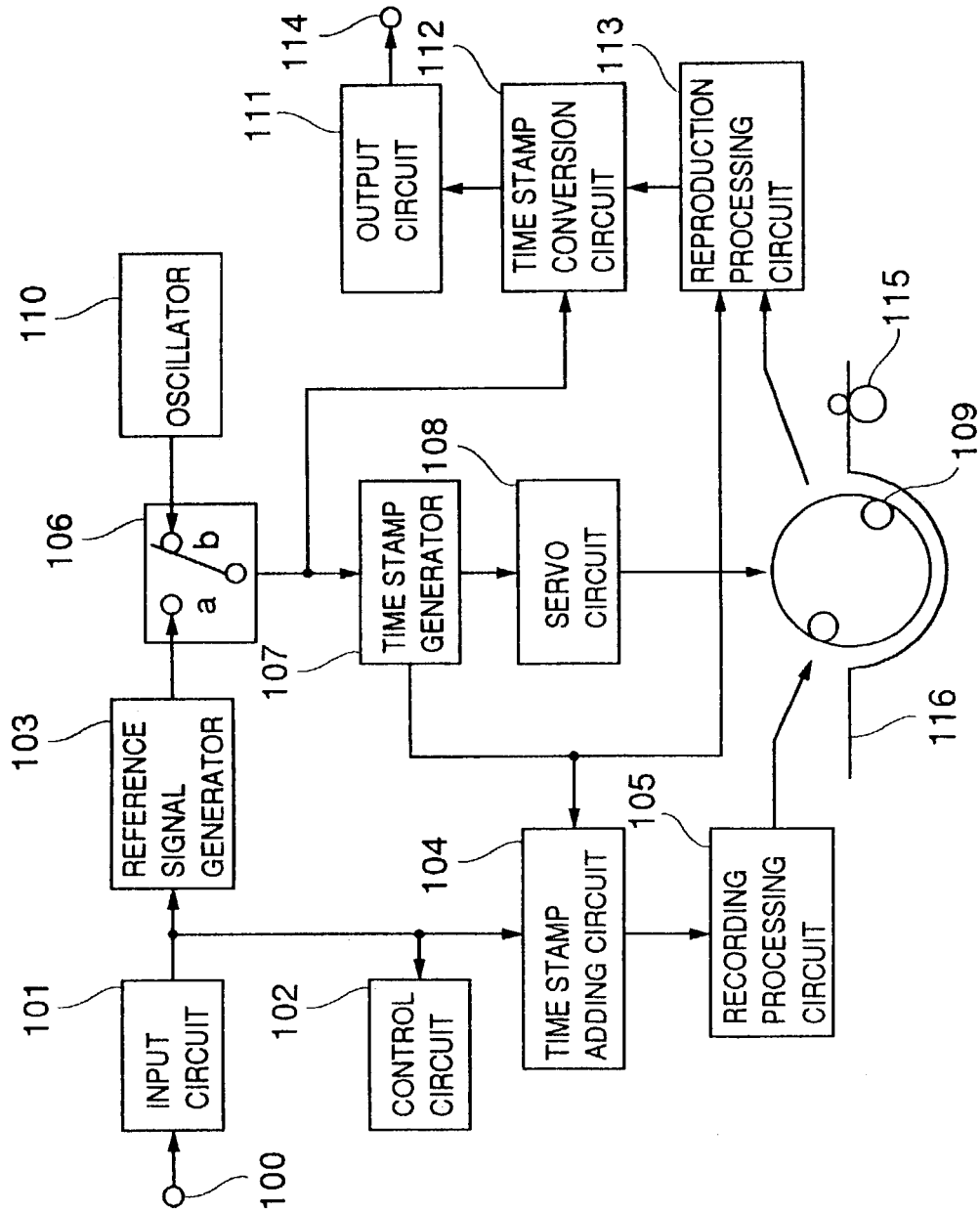
FIG. 1 is a block diagram showing a configuration of a digital signal recording and reproduction apparatus according to an embodiment of the invention.

FIG. 1 shows an example configuration of a digital signal recording and reproduction apparatus according to an embodiment of the invention. Although the apparatus shown in FIG. 1 has a dual function of recording and reproduction, the invention is of course applicable also to a recording and reproduction apparatus having recording and reproduction functions independent of each other.

In FIG. 1, reference numeral 100 designates a digital video signal input terminal, numeral 101 an input circuit, numeral 102 a control circuit, numeral 103 a reference signal generator, numeral 104 a time stamp adding circuit, numeral 105 a recording processing circuit, numeral 106 a switching circuit, numeral 107 a time stamp generator, numeral 108 a servo circuit, numeral 109 rotary magnetic heads, numeral 110 an oscillator, numeral 111 an output circuit, numeral 112 a time stamp conversion circuit, numeral 113 a reproduction processing circuit, numeral 114 an output terminal, numeral 115 a capstan, and numeral 116 a magnetic tape.

At the time of recording, the recording data in the form of packets for digital broadcast received by a digital broadcast receiving apparatus are input at arbitrary time intervals to the input circuit 101 through the input terminal 100. The packet data input by way of the input terminal 100 are changed to a predetermined timing at the input circuit 101, and then applied to the control circuit 102, the reference signal generator 103 and the time stamp adding circuit 104. The control circuit 102 detects the type of packet data, the maximum transmission rate, etc. on the basis of the information attached to the packet data or on the basis of the information sent separately from the packet data, determines the recording mode from the result of detection, and thus sets the operation mode of the recording signal processing circuit 105 and the servo circuit 108. The reference signal generator 103 generates a reference signal in synchronism with the output signal of the input circuit 101. The time stamp adding circuit 104 converts the time stamps contained in the packet data output from the input circuit 101 into a predetermined format and outputs them to the recording signal processing circuit 105. In accordance with the recording mode determined by the control circuit 102, the recording signal processing circuit 105 generates an error correction code, ID information, subcodes, etc. conforming to the format of the time stamp used for recording and the number of packets recorded in each track. The recording signal processing circuit 105 thus generated a recording signal, which is recorded on the magnetic tape 116 by the rotary magnetic heads 109.

At the time of reproduction, the reproduction operation is first performed in a given playback mode, and the reproduced signal processing circuit 113 detects the ID information. The control circuit 102 determines the mode in which the data have been recorded and the format of the time stamp used for recording. The control circuit 102 thus sets again the operation mode of the reproduced signal processing circuit 113 and the servo circuit 108 for reproduction. The reproduced signal processing circuit 113 detects a sync signal and detects and corrects an error from the signal reproduced by the rotary magnetic heads 109, reproduces the data, subcodes, etc., compares the time stamp added to the reproduced signal with the time stamp generated by the time stamp generator 107, and outputs the data to the time stamp conversion circuit 112 at a predetermined timing. The time stamp conversion circuit 112 converts the time stamp of the input reproduced signal to a time stamp conforming to the output devices, and outputs the data to the output circuit 111. The output circuit 111 outputs the data with the converted time stamp to the output terminal 114 at a predetermined timing.

At the time of recording, the operation timing of the recording apparatus is controlled by the reference signal generator 103 with reference to the time stamp added to the recording data input from the input terminal 100. At the time of reproduction, on the other hand, the clocks oscillated by the oscillator 110 are used as a reference of operation. This operation is performed by the control circuit 102 controlling the switching circuit 106.

Figure 2:
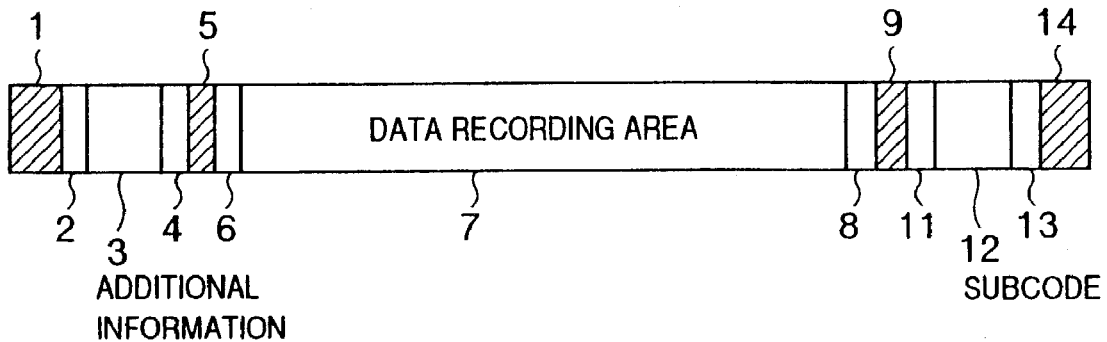
FIG. 2 is a diagram showing a recording pattern on a track.

FIG. 2 shows a recording pattern of a track. Numeral 3 designates an additional information recording area (field) for audio signal, etc., numeral 7 designates a data recording area (field) for recording a digital compressed signal, numeral 12 designates a subcode recording area (field) for recording subcodes such as a time stamp and program information, numerals 2, 6, 11 designate a preamble of each recording area (field), numerals 4, 8, 13 designate a postamble of each recording area (field), numerals 5, 9 designate a gap between recording areas, and numerals 1, 14 a margin of a track end. The after-recording processing of each recording area can be performed independently by providing a postamble, a preamble and a gap in each recording area. Digital signals other than the digital compressed video signal and the audio signal can of course be recorded in the recording areas 3 and 7. Also, the digital compressed audio signal can be recorded together with the digital compressed video signal in area 7.

Figure 3A:
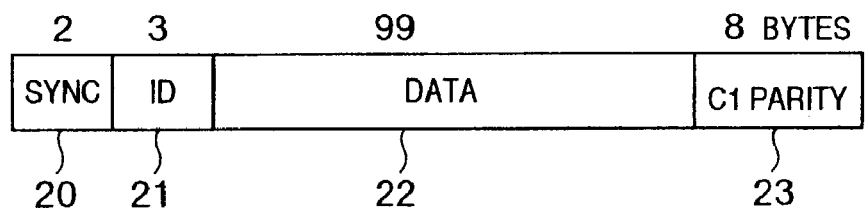
FIGS. 3A and 3B each are block diagrams showing a configuration of various areas.
Figure 3B:
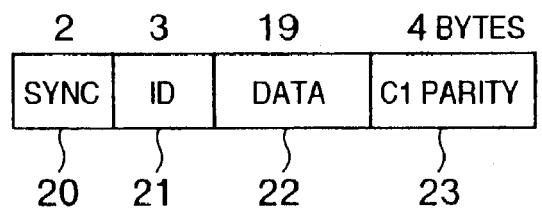

FIGS. 3A and 3B each show a block configuration of various each areas (fields). FIG. 3A, in particular, shows a block configuration of the additional information recording area 3 and the data recording area 7. Numeral 20 designates a sync signal, numeral 21 ID information, numeral 22 data, and numeral 23 a first parity for error detection and correction (C1 parity). The sync signal 20 is configured of 2 bytes, the ID information 21 of 3 bytes, the data 22 of 99 bytes and the parity 23 of 8 bytes, for example. Each block contains 112 bytes. FIG. 3B shows a block configuration of the subcode recording area 12. In the block of the subcode recording area, the sync signal 20 and the ID information 21 have the same number of bytes as the corresponding areas in FIG. 3A, while the data 22 has 19 bytes and the parity 23 has 4 bytes. Each block in FIG. 3B is configured of 28 bytes, i.e., one fourth the bytes of the block shown in FIG. 3A. In this way, different blocks are configured to have the relation of an integral multiple with each other, and all the areas have the same configuration of the sync signal 11 and the ID information 12. As a result, the operation of generating blocks and the operation of detecting the sync signal and the ID information at the time of recording can be processed by the same circuit.

Figure 4:
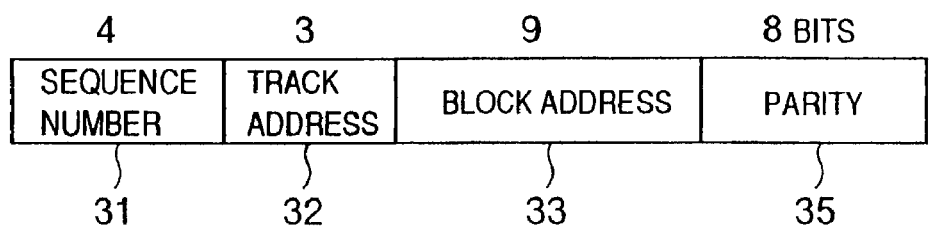
FIG. 4 is a diagram showing a configuration of ID information 21.

FIG. 4 shows a configuration of the ID information 21. Numeral 31 designates a sequence number, numeral 32 a track address, numeral 33 a block address in a track, and numeral 35 a parity for detecting an error of the sequence number 31, an error of the track address 32 and an error of the block address 33. The block address 33 is for identifying the block in each recording area. Block address numbers 0 to 335 are assigned for the data recording area 7, numbers 0 to 13 for the additional information recording area 3 and numbers 0 to 15 for the subcode recording area 12, for example. The track address 32 is for identifying a track and is changed for each one or two tracks, for example, from 0 to 5 or 0 to 2, and can thus identify six tracks. The sequence number 31 is changed for each six tracks identified by the track address 32 from 0 to 11, for example, whereby 72 tracks can be identified. The processing at the time of recording and the identification at the time of reproduction is facilitated, in the case where the track addresses are synchronous with the period of the second error correction code described later and the sequence numbers are synchronous with the period of recording the variable-speed reproduction data described later.

Figure 5:
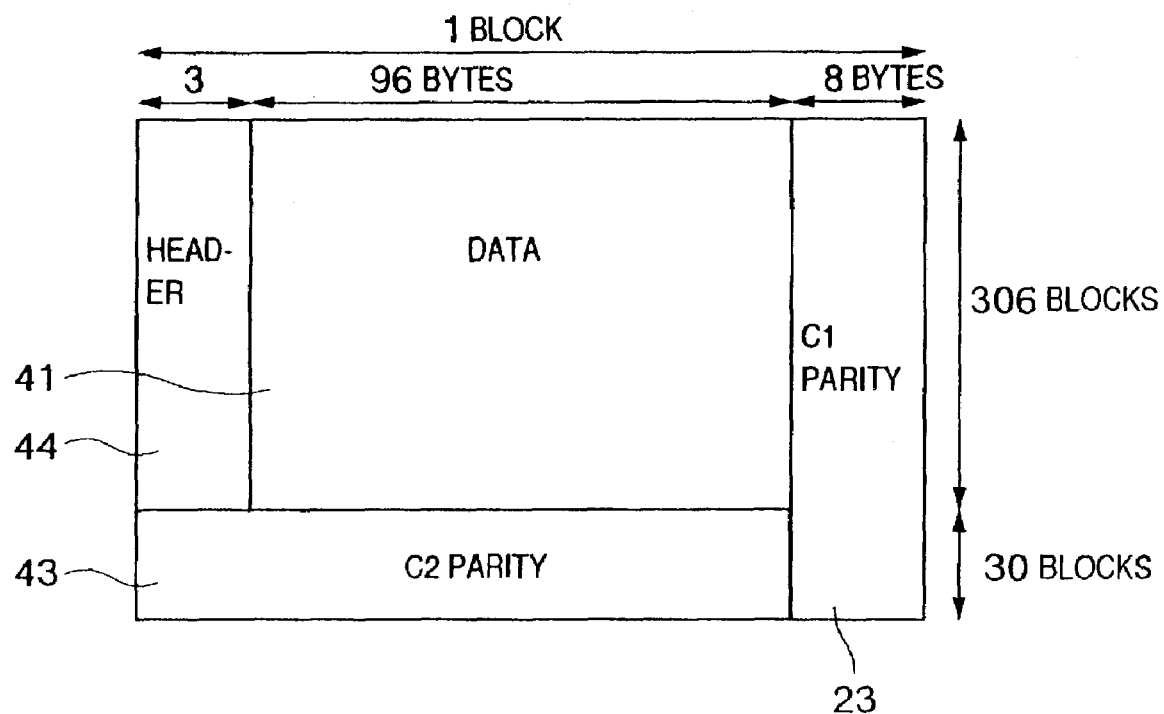
FIG. 5 is a diagram showing a configuration of data on a track in a data recording area 7.

FIG. 5 shows a data configuration of a track in the data recording area 7. The sync signal 20 and the ID information 21 are not shown in FIG. 5. The data recording area 7 is configured of 336 blocks, for example, of which data 41 are recorded in the first 306 blocks and the second error correction code (C2 parity) 43 is recorded in the next 30 blocks.

A 10-block C2 parity is added to each 102 blocks obtained by dividing data of 306 (blocks)×6 (tracks) into 18 portions, for example. The Reed-Solomon code, for example, is used as an error correction code.

Figure 6:
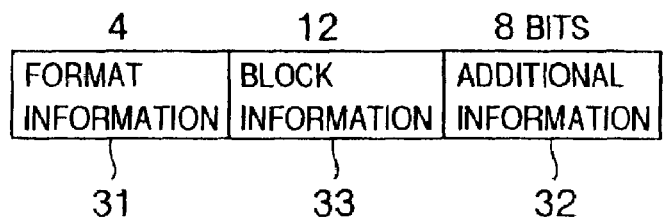
FIG. 6 is a diagram showing a configuration of a header 44 of the data recording area 7.

The 99-byte data of each block is configured of a 3-byte header 44 and a 96-byte data 41. FIG. 6 shows a configuration of the header 44 of the data recording area 7. The header 44, in turns, includes format information 31, additional information 32 and block information 33.

Figure 7:
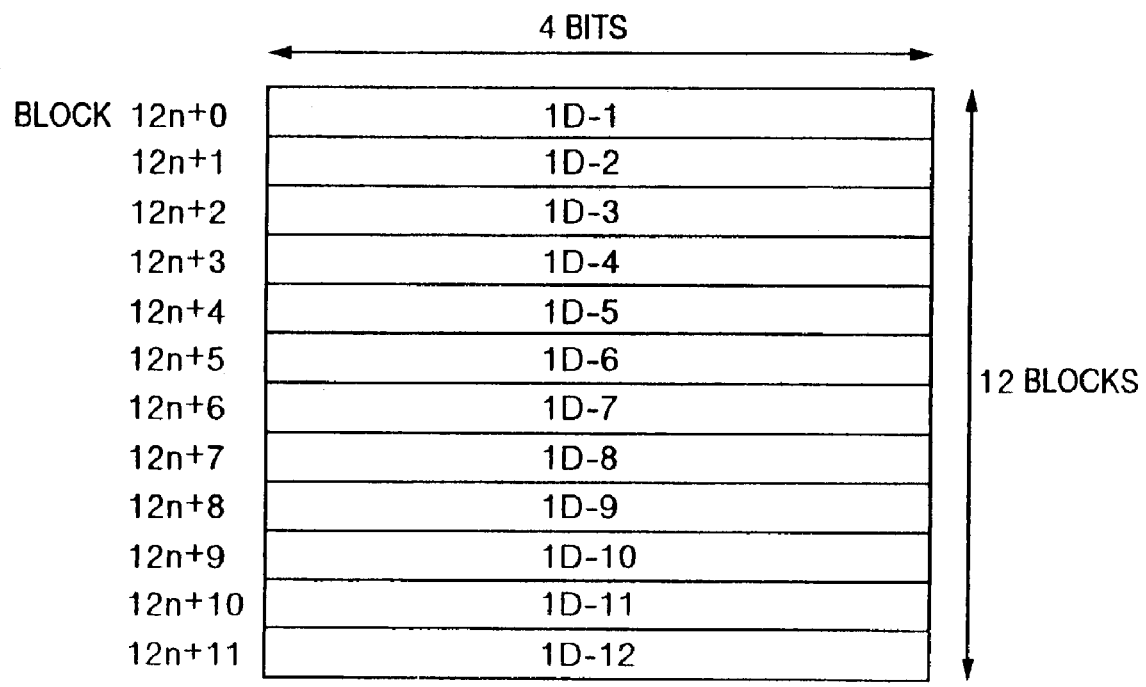
FIG. 7 is a diagram showing a configuration of format information 31.

FIG. 7 shows a configuration of the format information 31. The format information 31 is the one relating to the recording format, and a piece of information 31 is comprised of 12 blocks representing 6 bytes. This information is recorded a plurality of times in multiplex way thereby to improve the detection capability at the time of reproduction. The 6-byte data includes such information as the size of each block, the presence or absence of the additional information recording area 3, the number of programs recorded, the rotational speed of the rotary head, the format of the error correction code, the recording mode, the format of the added time stamp and the format of the data to be recorded.

The format of the data to be recorded specifies the length of the packet recorded, for example. The amount of data recorded in one track is controlled by packet, and the number of packets recorded is stored to accommodated an arbitrary transmission rate. The data amount recorded is controlled for each track or for each set of a plurality of tracks. Also, an arbitrary packet length can be accommodated by recording the packet length. Further, a plurality of time-stamp recording schemes can be accommodated by recording the identification signal for the time stamps added at the time of recording, thereby making it possible to decide whether the time stamp is required to be changed at the time of reproduction.

At the time of reproduction, the format information 31 is detected to discriminate the recording mode and the time stamp format, so that the reproduction processing circuit and the time stamp conversion circuit are set to the particular mode for reproduction.

Figure 8:
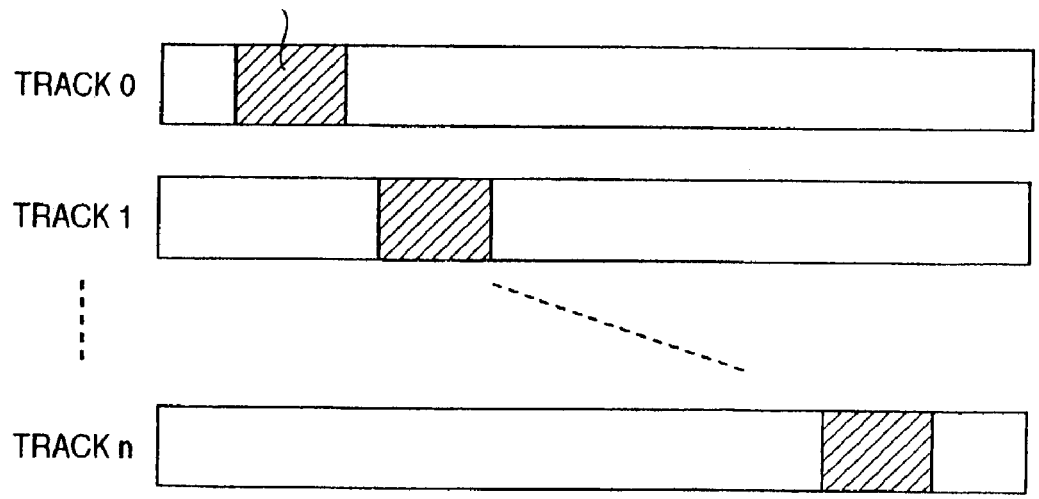
FIG. 8 is a diagram showing an example of recording variable-speed reproduction data.

Also, the information for recording the variable-speed reproduction data of the format information 31 may be recorded. In the case where the data 50 dedicated to the variable-speed reproduction is recorded in a predetermined position corresponding to the head trace at the time of variable-speed reproduction, as shown in FIG. 8, a superior playback image can be reproduced also at the time of variable-speed reproduction. Whether this data is recorded or not or what type of data are recorded is stored and this information is identified at the time of reproduction, whereby the variable-speed reproduction can be easily accommodated.

Figure 9:
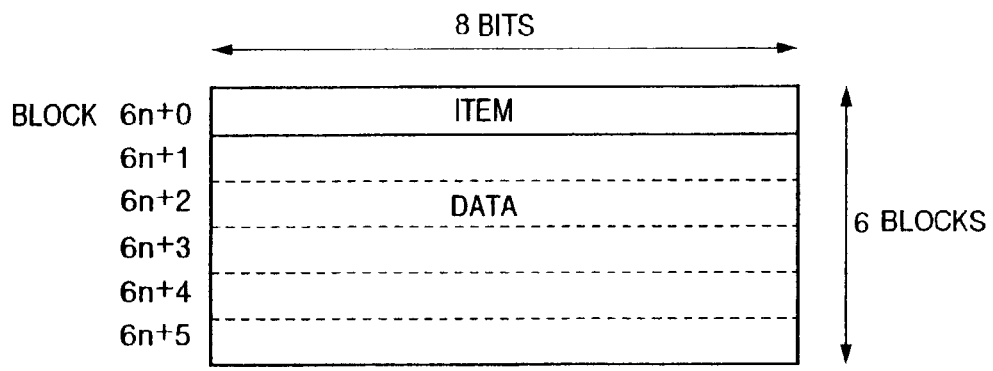
FIG. 9 is a diagram showing a configuration of additional information 32.

FIG. 9 shows a configuration of the additional information 32. A piece of additional information 32 is configured with 6 blocks representing 6 bytes, for example, including the first one byte representing an item code indicating the type of information and the remaining 5 bytes representing data. In this way, various types of data such as the recording time and the type of the recording signal can be recorded. Detailed information on the variable-speed reproduction data associated with the format information 31 can be recorded in this area.

Figure 10:
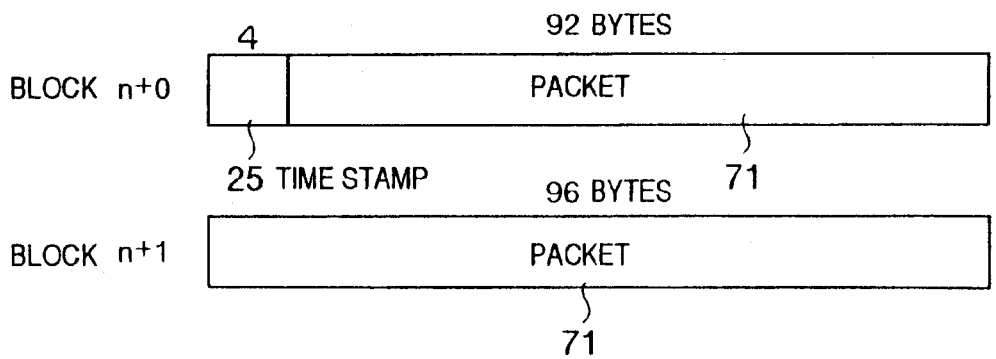
FIG. 10 is a diagram showing a configuration of blocks used for recording the digital compressed video signal transmitted in packets of 188 bytes in a data recording area 41.

FIG. 10 shows an example configuration of a block used for recording in the recording area 41 the digital compressed video signal transmitted in 188-byte packets. In this case, the 4-byte time stamp 25 is added to make 192 bytes, and one packet is recorded in each two blocks. Thus a packet of data is recorded in two blocks for each C1 code string. In the event that correction is impossible by block due to a burst error caused by a drop-out or the like on the tape, the error is prevented from affecting a plurality of packets constituting a unit of transmission.

Figure 11:
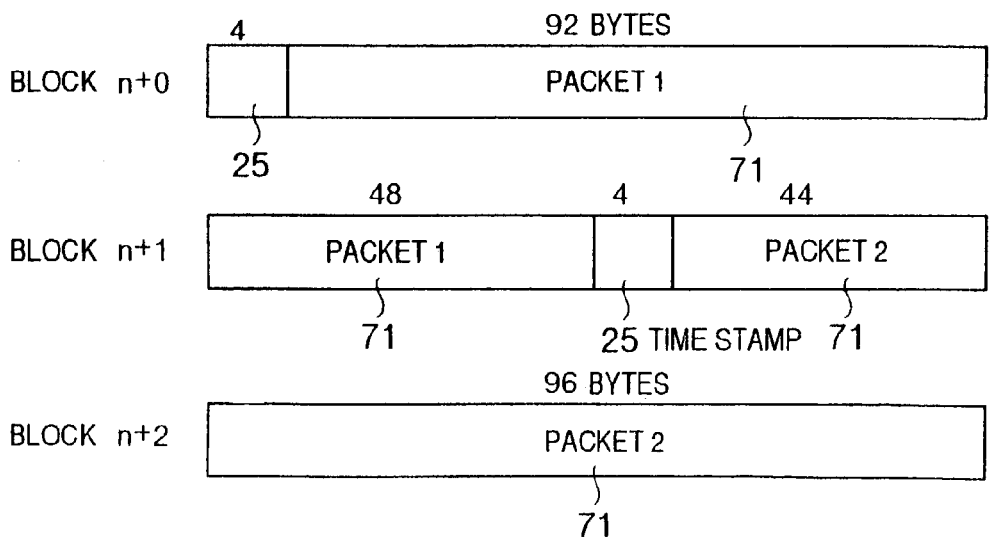
FIG. 11 is a diagram showing a configuration of blocks with the packet 71 set to the length of 140 bytes.
Figure 12:
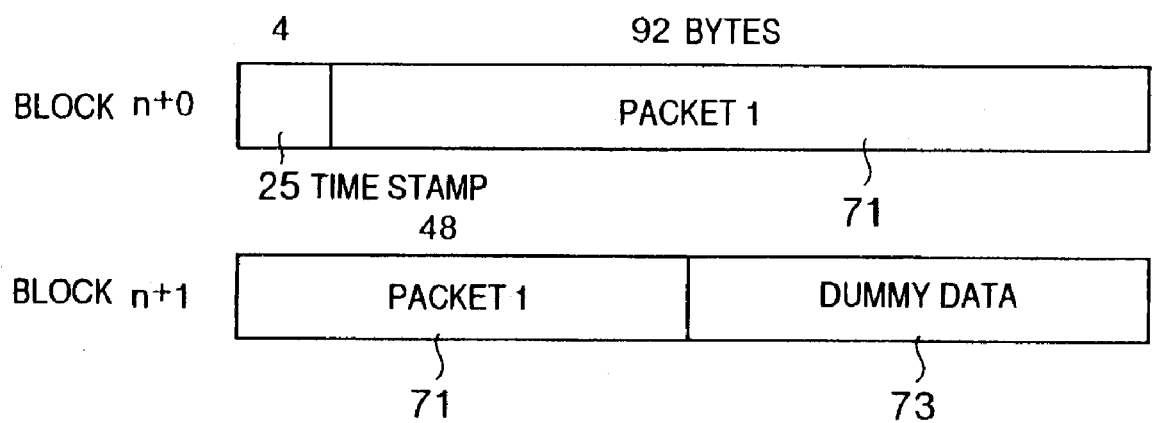
FIG. 12 is a diagram showing another configuration of blocks with the packet 71 set to the length of 140 bytes.

FIG. 11 shows a configuration of a block with the packet 71 set to the length of 140 bytes. In this case, two packets 71 are recorded in three blocks. Also, in the case where only one packet exists, the packet is arranged in two blocks as shown in FIG. 12. Specifically, the one packet is arranged in 1.5 blocks, and the remaining 0.5 blocks is filled with dummy data.

Figure 13:
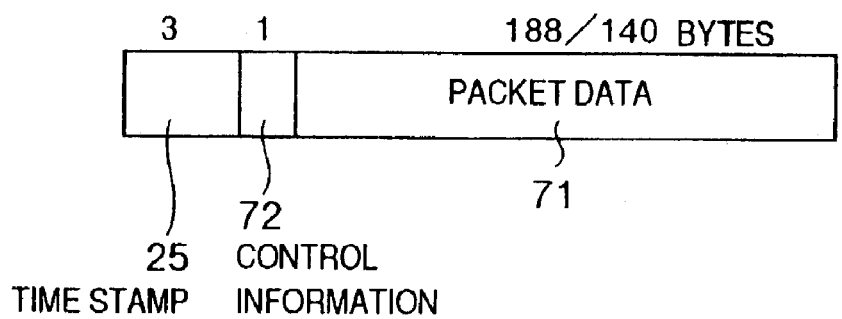
FIG. 13 is a diagram showing another configuration of the packet shown in FIG. 10, 11 or 12.

FIG. 13 shows another example configuration of the packet of FIG. 10, 11 or 12. The packet includes a 3-byte time stamp 25 and one-byte packet-related control information 72 as a 188-byte or 140-byte packet data 71. In the case where the number of the packet data 71 is smaller than this and is 130 bytes, for example, dummy data may be additionally recorded or the area for the control information is be increased.

The time stamp 25 represents the information on the time at which a packet is transmitted. Specifically, when (the leading portion of) a packet is transmitted, the time stamp generated by the time stamp generator is recorded together with the data of the particular packet. At the time of reproduction, the intervals between packets are set on the basis of this information, thereby making it possible to output the data in the same format as when transmitted.

Figure 14:
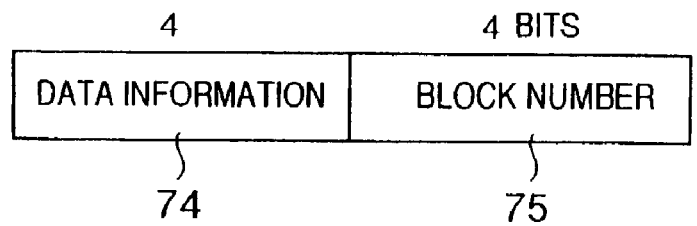
FIG. 14 is a diagram showing a configuration of block information 33.

FIG. 14 shows a configuration of the block information 33. The block information 33 is for identifying the data by block. The data information 74 is for identifying the type of the data recorded in a particular block. For example, the figure is 0 for a block having a normal packet data recorded therein, 1 for a block having no effective data recorded therein, and 2 for a block having variable-speed reproduction data recorded therein. The block number 75 is information for identifying the block sequence in the case where the packet data are recorded in units of two or three blocks. The figure is 0 to 1 in the case where the packet data are recorded in units of two blocks, for example, and 0 to 2 in the case where the packet data are recorded in units of three blocks. Further, these information, if capable of identifying the end of the recording area, facilitate the reproduction processing.

Figure 15:
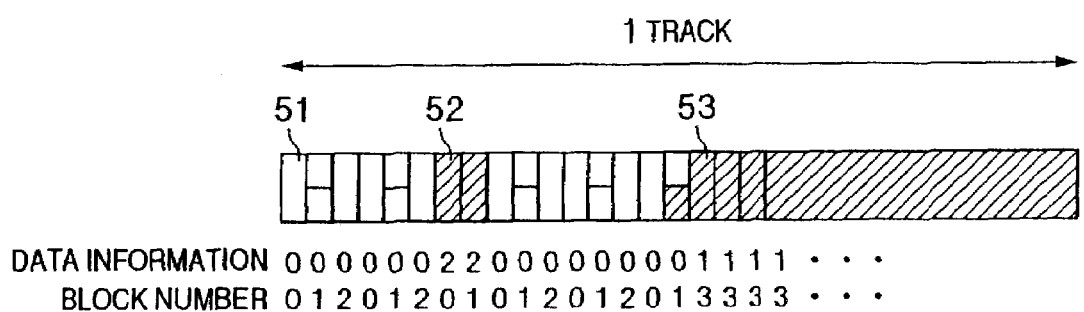
FIG. 15 is a diagram showing an example of recording the block information 33.

FIG. 15 shows an example of recording the block information 33 with the packets recorded in the arrangement as shown in FIG. 11 or 12. Numeral 51 designates a block having normal packet data recorded therein, numeral 52 a block having a variable-speed reproduction data recorded therein, and numeral 53 an unused area. The data other than the variable-speed reproduction data are recorded in a front packing fashion, and therefore, the packet data input at arbitrary intervals can be efficiently recorded. In the case where there exists any invalid block inbetween, the data information 74 of the particular block is set to 1. In the unused area 53, the data information 74 is set to 1 and the block number 75 is set to 3, whereby the data end can be detected.

At the time of reproduction, the data information 74 is identified by block, and in the case where the blocks other than those set to 1 can be skipped in output. As a result, no matter where the variable-speed reproduction data or the invalid data are recorded, the compatibility can be maintained for reproduction. Also, even in the case where special data other than the above-mentioned data are recorded, there occurs no problem if the particular blocks are assigned different data information. Further, the end of a recording area can be detected by identifying a block having the data information 74 of 1 and the block number of 3. In this way, access to an unrequired area is eliminated and thus the burden for reproduction is reduced.

Figure 16:
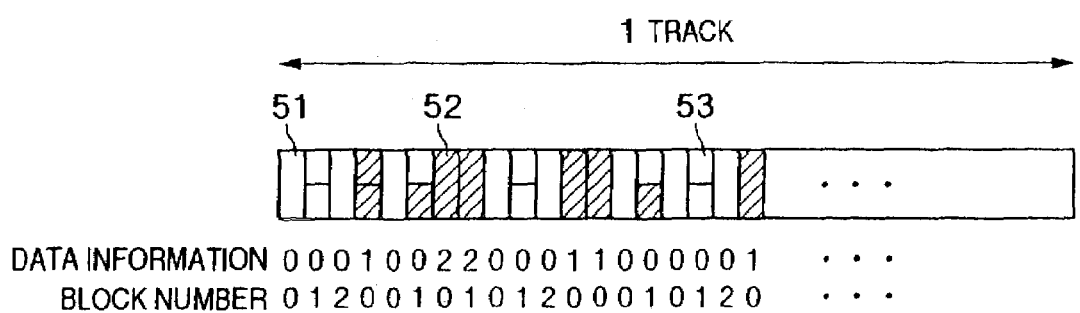
FIG. 16 is a diagram showing another example of recording the block information 33.

FIG. 16 shows an example for the case in which data are not front-packed, i.e., for the case where the packets are recorded at positions corresponding to input positions. In this case, the unused area is fragmented over the entire track, and therefore it is not necessary to identify the data end.

Figure 17:
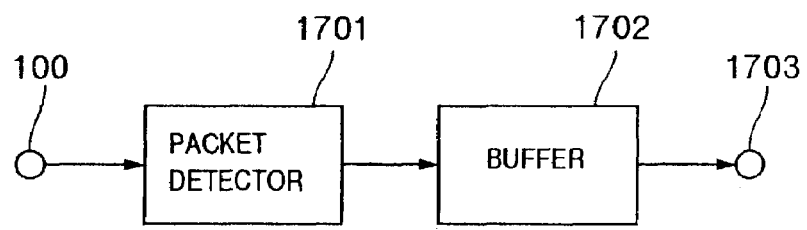
FIG. 17 is a block diagram showing a configuration of an input circuit 101.

FIG. 17 is a block diagram showing the input circuit 101 according to an embodiment. Numeral 100 designates a digital video signal input terminal input with a digital video signal from an external digital broadcast receiving apparatus, numeral 1701 a packet detector for detecting the data packet from the digital video signal input thereto, numeral 1702 a buffer memory for temporarily storing the digital video signal input thereto, and numeral 1703 an output terminal.

Figure 18:
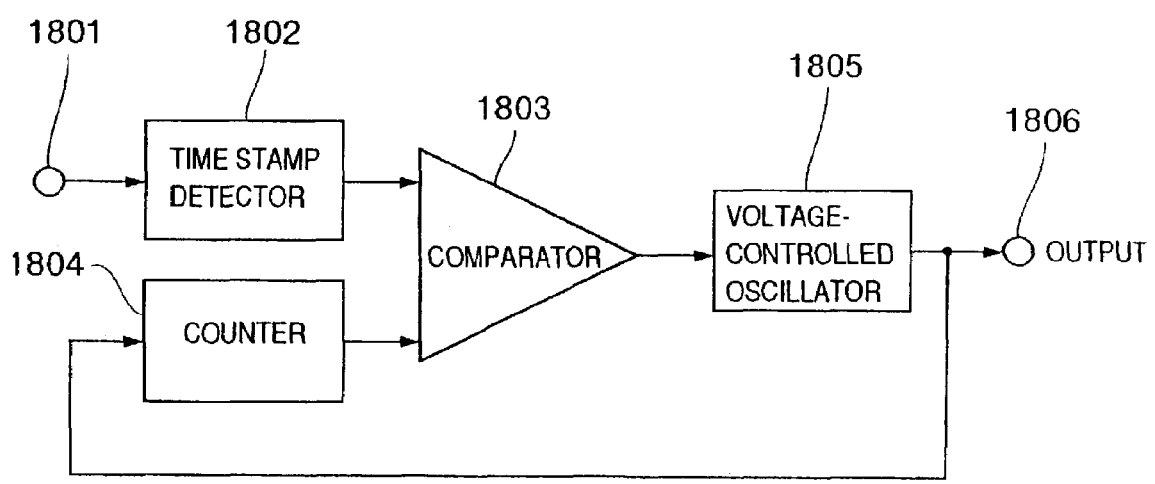
FIG. 18 is a block diagram showing a configuration of a reference signal generator 103.

FIG. 18 is a block diagram showing a reference signal generator 103 according to an embodiment. Numeral 1801 designates an input terminal supplied with data from the input circuit 101, numeral 1802 a time stamp detector for detecting a time stamp from the input signal, numeral 1803 a comparator for comparing the output of the time stamp detector 1802 with the count value on the counter 1804 for counting the output of a voltage-controlled oscillator (VCO) 1805, and numeral 1806 an output terminal.

Figure 19:
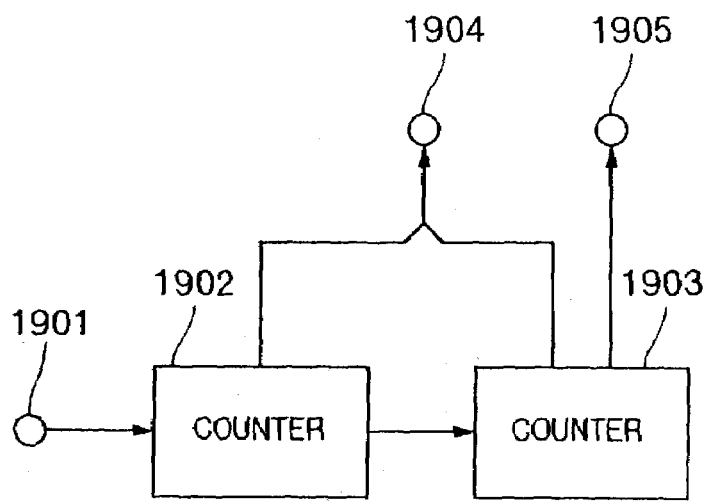
FIG. 19 is a block diagram showing a configuration of a time stamp generator 107.

FIG. 19 is a block diagram showing a configuration of the time stamp generator 107 for generating a 26-bit time stamp according to an embodiment. Numeral 1901 designates an input terminal supplied with the reference signal selected by the switching circuit 106, numeral 1902 an 18-bit counter for counting the input signal, numeral 1903 an 8-bit counter for counting the carry-on of the counter 1902, numeral 1904 an output terminal-for outputting a 26-bit time stamp representing the sum of the count values on the counter 1902 and the counter 1903, and numeral 1905 an output terminal for outputting a reference signal of the frame frequency.

Figure 20:
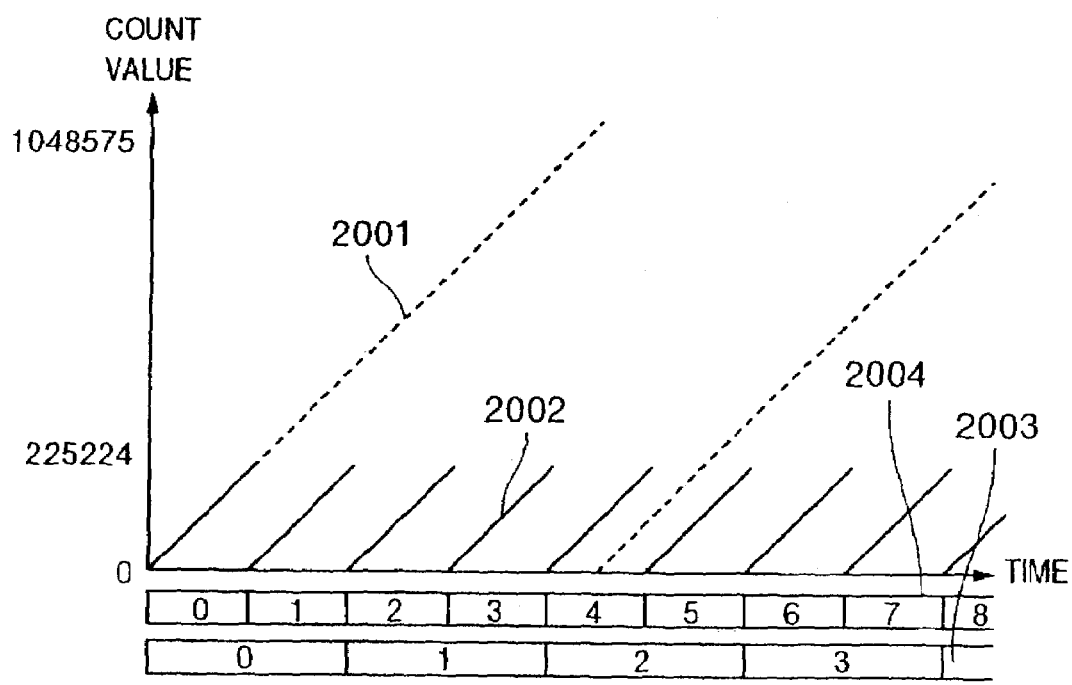
FIG. 20 is a diagram showing the relation between the time stamp added to the input digital video signal and the time stamp generated by the time stamp generator 107.

FIG. 20 is a graph showing an example relation between the time stamp added to the digital video signal input and the time stamp generated by the time stamp generator 107. Numeral 2001 designates the value of the time stamp added to the digital video signal input, numeral 2002 a graph showing the 18 low-order bits of the time stamp generated in the time stamp generator 107, numeral 2003 the 8 high-order bits of the time stamp, and numeral 2004 the track number on the magnetic tape. The time stamp added to the input digital video signal assumes 20 successive bits according to the embodiment under consideration. The time stamp, therefore, increases from 0 to 1048575 and then returns to 0. The time stamp generated by the time stamp generator 107, on the other hand, is synchronous with the rotation of the rotary magnetic heads and has a period equal to one half of a track. This time stamp has 18 bits and increases from 0 to 225224 and then returns to 0. In the process, the 8 high-order bit count on the counter 1903 is incremented by one. As a result, a 26-bit time stamp in synchronism with the track period is generated.

Figure 21:
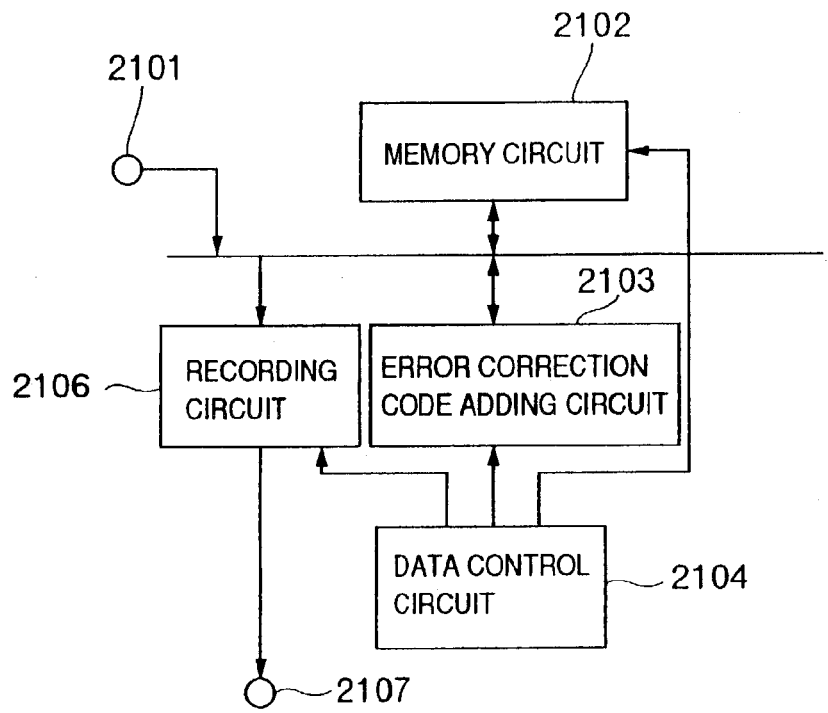
FIG. 21 is a block diagram showing a configuration of a recording signal processing circuit 301.

FIG. 21 shows a configuration of the recording processing circuit 105. Numeral 2102 designates an input terminal supplied with the packet data of the digital video signal with the time stamp added thereto by the time stamp adding circuit 104, numeral 2102 a memory circuit for storing the packet data, numeral 2103 an error correction code adding circuit for adding an error correction code, numeral 2104 a data control circuit for controlling the memory circuit 2102, the error correction code adding circuit 2103 and the recording circuit 2106, numeral 2106 the recording circuit for modulating the data stored in the memory circuit 2102 in a predetermined manner and converting it into a signal recordable by the rotary magnetic heads 109, and numeral 2107 an output terminal for outputting a signal modulated in a predetermined manner by the recording circuit 2106.

Figure 33:
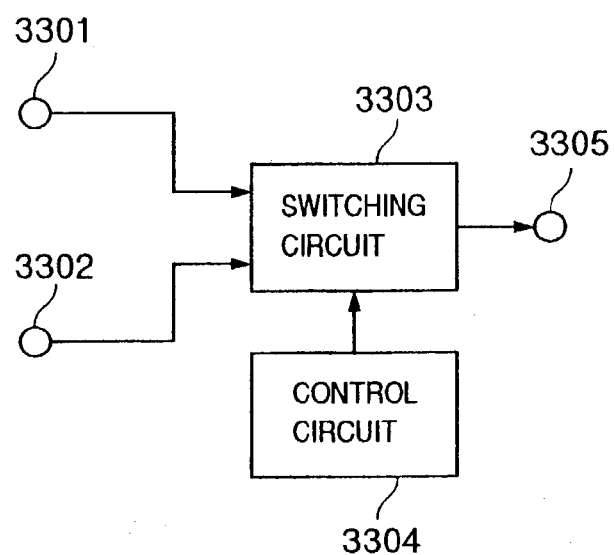
FIG. 33 is a block diagram showing a configuration of a time stamp adding circuit 104.

FIG. 33 is a block diagram showing a configuration of the time stamp adding circuit 104. Numeral 3301 designates a time stamp input terminal supplied with the time stamp generated by the time stamp generator 107, numeral 3302 a data input terminal supplied with the packet data from the input circuit, numeral 3303 a switching circuit for switching the time stamp and the packet data, and numeral 3304 a control circuit for controlling the switching circuit.

A specific recording operation will be explained with reference to FIGS. 17 to 21 and 33. The transmission rate of the packets input to and output from the input terminal 100 is assumed to be higher than that of the clock frequency at which the time stamps are generated. The reference clock for the time stamp, for example, is 27 MHz, and the packets are input/output at the rate of 49.152 Mbps. Also, the reference clock for the time stamp has the same frequency as the reference clock of the recording and reproduction apparatus generated by the oscillator 110. As described later, this facilitates the recording and reproduction processing.

Figure 25:
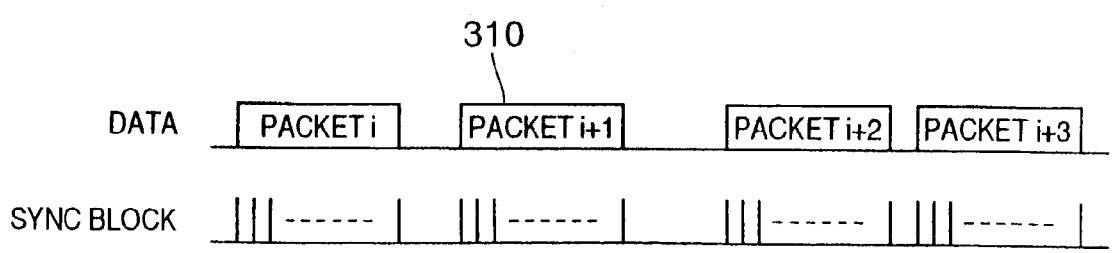
FIG. 25 is a timing chart of input and output signals.
Figure 26:
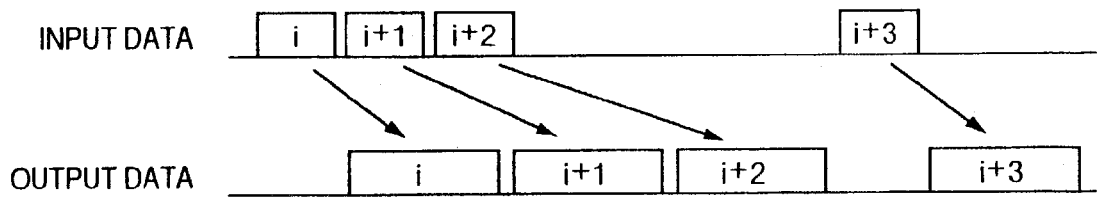
FIG. 26 is a timing chart of input and output signals of a buffer 309.
Figure 27:
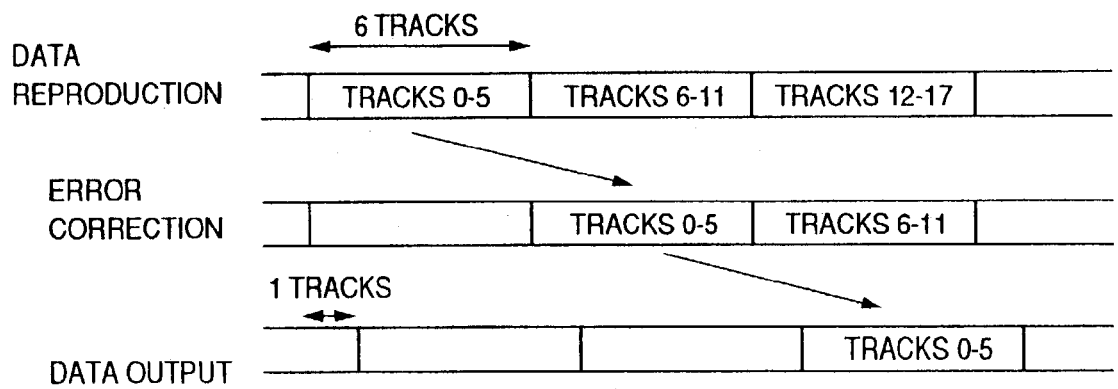
FIG. 27 is a timing chart of storage, error correction and output of the reproduced data in a memory circuit 2106 at the time of reproduction.

At the time of recording, the data and the sync clock are applied to the input terminal 100 at the timings as shown in FIG. 25. Numeral 310 designates the data shown in FIG. 13.

The input data and the synch clock are applied to the packet detector 1701, and the head of the packets is detected by detecting an inter-packet blank, so that the head of a packet is assumed to have been detected when data arrives following the blank. Also, the type of a packet and the normality of transmission of the packet is determined by detecting the number of data in one packet by the packet detector 1701. Specifically, in the case where a packet having a length other than a predetermined value (i.e., a packet not associated with a device) is detected, it is decided that the packet is not normally transmitted or that data that cannot be recorded is transmitted. Then this information is sent to the control circuit 102 to interrupt the recording operation.

The packet 71 detected by the packet detector 1701 is supplied from the output terminal 1703 through the buffer 1702 to the control circuit 102, the reference signal generator 103 and the time stamp adding circuit 104 at predetermined timings.

The buffer 1702 is for converting the transmission rate of the input data. In the case where the transmission rate is as high as about 50 Mbps, an attempt to record in the memory circuit 2102 at such a high rate requires the use of a memory circuit very high in speed. In view of the fact that the average maximum recording rate of the recording and reproduction apparatus is about 25 Mbps, as described above, on the other hand, the memory circuit 2102 is set to a rate corresponding to the maximum recording rate, and the data are stored through the high-speed buffer to the memory circuit 2102. In this way, the rate of the memory circuit can be maintained at a low value. FIG. 20 shows the input/output timings of the buffer 1702. In the case where the storage rate of the memory circuit 2102 is 27 Mbps (3.375 bytes/sec), for example, the ratio between the input and output rates of the buffer is about 1:2. In this case, the input of seven or more successive packets at the rate of 50 Mbps can be accommodated even in the case where the buffer capacity is about seven packets.

The input digital video signal has already added thereto a 20-bit time stamp, for example, counted by the reference signal of 27 MHz. The time stamp detector 1802 in the reference signal generator 103 detects the time stamp from the packets of the input signal and applies it to the comparator 1803.

The voltage-controlled oscillator (VC0) 1805 in the reference signal generator 103, on the other hand, oscillates at about 27 MHz. The output of the voltage-controlled oscillator 1805 is connected with a counter 1804 of the same 20 bits as added to the input signal, which counter 1804 counts the number of clocks generated by the voltage-controlled oscillator 1805. The resulting count is applied to the comparator 1803.

The comparator 1803 compares the result of detection at the time stamp detector 1802 with the count value on the counter 1804, and applies the result of comparison to the voltage-controlled oscillator 1805. In the case where the count value on the counter 1804 is smaller than the result of detection by the time stamp detector 1802, it indicates that the reference signal is delayed and therefore the control voltage of the voltage-controlled oscillator 1805 is increased, thereby increasing the oscillation frequency. In the case where the count value on the counter 1804 is larger than the result of detection by the time stamp detector 1802, by contrast, it indicates that the reference signal is advanced and therefore the control voltage of the voltage-controlled oscillator 1805 is decreased thereby to reduce the oscillation frequency.

As a result of the above-mentioned control process, the frequency of the reference signal generated by the reference signal generator 103 completely coincides with the frequency of the reference signal used for adding the time stamp of the input signal and thus can secure synchronism.

Instead of the above-mentioned configuration using the voltage-controlled oscillator, a synchronization method by the digital signal processing can be conceived for the reference signal generator 103. The present invention, however, can be realized with any type of reference signal generator.

At the time of recording, the control circuit 102 turns the switching circuit 106 to side a so that the reference signal generated by the reference signal generator 103 is applied to the time stamp generator 107.

The time stamp generator 107 generates a predetermined time stamp on the basis of the reference signal. An example of the time stamp used for recording is a 26-bit time stamp in synchronism with the recording track.

The reference signal applied to the reference signal input terminal 1901 is frequency-divided by 225225, for example, by the low-order counter 1902 in the time stamp generator 107. The counter 1902 is incremented by one for each rise of the reference signal, and returns to 0 after reaching 225224. The count value represents the 18 low-order bits of the time stamp. Further, at the same time that the counter 1902 returns to 0, the high-order counter 1903 is incremented by one. The high-order counter 1903 returns to 0 after counting up to 11, for example. The value on the high-order counter represents the eight high-order bits. This maximum count value depends on the recording or reproduction mode of the digital video recording and reproduction apparatus and is controlled by the control circuit 102. The relation between the count value and the time stamp added to the digital video signal input is shown in FIG. 20. The sum of the two count values described above constitute a 26-bit time stamp which is supplied to the time stamp adding circuit 104 and the reproduction processing circuit 113.

The second bit from the least significant bit of the count value on the high-order counter 1903 assumes 29.97 Hz which coincides with the frame frequency of the video signal. This signal is supplied as a sync signal to the servo circuit 107. The servo circuit 107 adjusts the rotational speed and phase of the rotary magnetic heads 109 and the running speed of the magnetic tape 116 in synchronism with the sync signal, and thereby controls them in such a manner that the recording data are written at a predetermined track position on the magnetic tape 116. Two-track data are written and the high-counter 1903 counts four while the rotary magnetic heads 109 makes one rotation.

As a result of changing the frequency dividing ratio of the counter 1902 in the time stamp generator 107, an arbitrary time stamp can be generated. The number of bits of the time stamp generated by the time stamp generator 107, the frequency-dividing ratio and the reference frequency can of course be set to an arbitrary value, and are not necessarily synchronous with the position of the recording track. The time stamp generator may be configured in such a manner as to change the frequency-diving ratio by the control circuit 102.

The reference signal input to the servo circuit in synchronism with the frame frequency can be generated by a circuit independent of the time stamp generator.

The control circuit 3304 in the time stamp adding circuit 104 discriminates the time stamp position in the input signal and controls the switching circuit 3303 according to the timing of the input packet, thereby replacing the time stamp in the input signal with another time stamp supplied from the time stamp generator 107. The data of each packet with the time stamp thereof replaced is applied through the output terminal 3305 to the input terminal 2102 of the recording signal processing circuit 105.

In the recording signal processing circuit 105, the packet data input to the input terminal 2101 are stored in the memory circuit 2102 at the rate of as many packets in each corresponding one track as input during a period corresponding to one recording track. At the same time, the block information 33 and the like are added. At a position where a dummy data is to be recorded, fixed data such as 0 data can be stored. The data stored in the memory circuit 2102 has added thereto an error correction code at the error correction code adding circuit 2103, and has added thereto the sync signal 20 and the like at the recording circuit 2106. In this way, the recording signal shown in FIG. 2 is generated, output from the output terminal 2107 to the rotary magnetic heads 109 and recorded on the magnetic tape 117.

The control signal and the like sent with the packet are output to the control circuit 102 for determining the packet type and the recording mode.

As a result of the above-mentioned processing, the recording timing and the rotational speed of the rotative head 109 can be synchronized with the time stamp 25. Since these information are recorded in synchronism, all that is required at the time of reproduction is to control the packet output and the reproduction using the reference clock of the recording and reproduction apparatus generated by the oscillator 110. In other words, without a special synchronization operation at the time of reproduction, the number of packets reproduced coincides with the number of packets output. Also, the time stamp recorded corresponds to the record timing and the rotation of the rotary magnetic heads.

Figure 37:
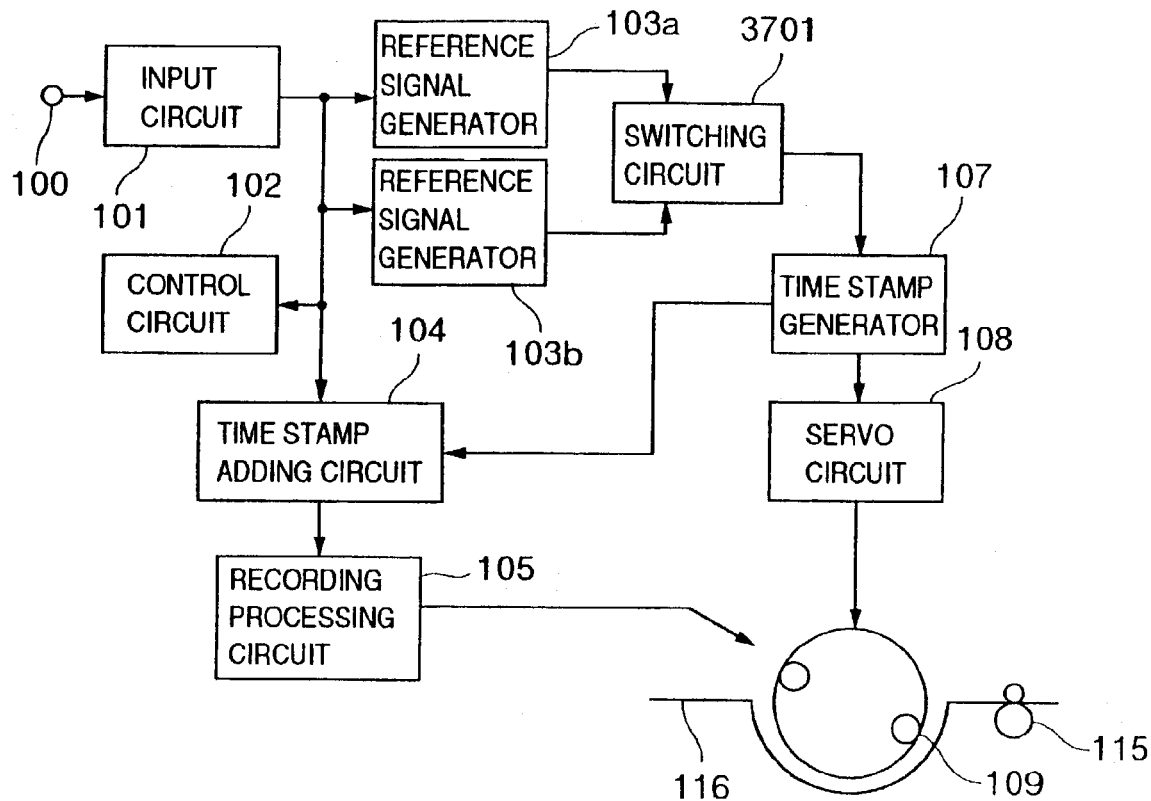
FIG. 37 is a block diagram showing a configuration of a digital signal recording apparatus including a plurality of reference signal generators according to another embodiment of the invention.

In the recording and reproduction apparatus shown in FIG. 1, only one type of the digital broadcast receiving apparatus is connected to the input terminal 100. As shown in FIG. 37, however, the input signals from two or more different digital broadcast receiving apparatuses can be recorded by providing a plurality of reference signal generators.

FIG. 37 is a block diagram showing a digital signal recording apparatus including a plurality of reference signal generators. In FIG. 37, numerals 103a and 103b designate reference signal generators for generating a reference signal from different digital input signals, and numeral 3701 a switching circuit. The other reference numerals designate like component parts as the corresponding symbols in FIG. 1, respectively.

The output of the input circuit 101 is applied to the reference signal generators 103a and 103b. The reference signal generator 103a is associated with a 20-bit time stamp generated from a reference signal of 27 MHz, for example, and can generate a reference signal only in response to such a time stamp input thereto. The reference signal generator 103b, by contrast, corresponds to the packet data containing no time stamp, and can generate a reference signal on the basis of the transfer clock for the packet data.

The digital data input to the input terminal 100 is applied to the control circuit 102 through the input circuit 101. The control circuit 102 discriminates the format of the time stamp added to the digital signal from the control signal in the input digital data. The control circuit 102 discriminates to which of the reference signal generator 103a or 103b the format of the input digital signal corresponds to, and controls the switching circuit 3701 on the basis of the result of discrimination.

As a result, even in the case where the input digital signal has a plurality of formats, a correct reference signal can be generated for correct recording and reproduction.

In the digital signal recording apparatus mentioned above, a plurality of reference signal generators are prepared and a reference signal generated is selected by the switching circuit. As an alternative, a single reference signal generator meets the requirement by a configuration in which the frequency-dividing ratio or the like in the reference signal generator can be set externally.

Figure 38:
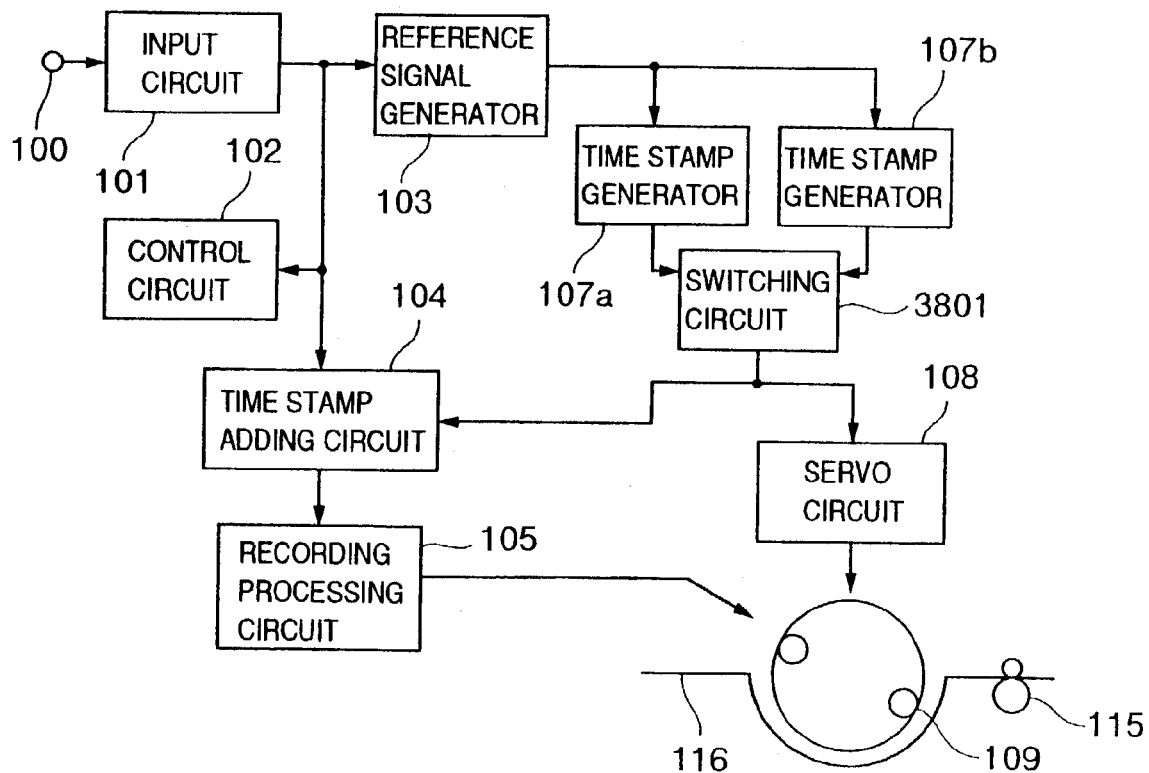
FIG. 38 is a block diagram showing a configuration of a digital signal recording apparatus including a plurality of time stamp generators according to another embodiment of the invention.

FIG. 38 is a block diagram showing a digital signal recording apparatus comprising a plurality of time stamp generators. In FIG. 38, numerals 107a and 107b are time stamp generators for generating different time stamps, respectively, and numeral 3801 is a selector for selecting the output of the time stamp generators.

The digital signal input to the input terminal 100 is applied through the input circuit 101 to the reference signal generator. The reference signal generated by the reference signal generator is applied to the time stamp generators 107a and 107b. The time stamp generator 107a generates a time stamp of 26 bits synchronous with the track period on the magnetic tape, for example. Specifically, it is identical to the time stamp described with reference to FIG. 1. The time stamp generator 107b, on the other hand, generates a time stamp of 20 bits independent of the track period. One of the time stamps generated by the two time stamp generators 107a, 107b is selected by the switching circuit 3801. The time stamp thus selected is applied to the time stamp adding circuit 104, added to the packet data and recorded on the magnetic tape.

In the digital signal recording apparatus described above, the format of the time stamp recorded on the magnetic tape can be selected by the switching circuit, and therefore the compatibility of the magnetic tape can be enhanced.

The digital signal recording apparatus shown in FIG. 38 represents an example comprising a plurality of time stamp generators, in which the outputs of the respective time stamp generators can be switched by the switching circuit and added. The switching circuit, however, can of course be included in the time stamp adding circuit. Also, in the case where the number of bits of the counter and the frequency dividing ratio in the time stamp generators can be set externally, a single time stamp generator serves the purpose.

Figure 39:
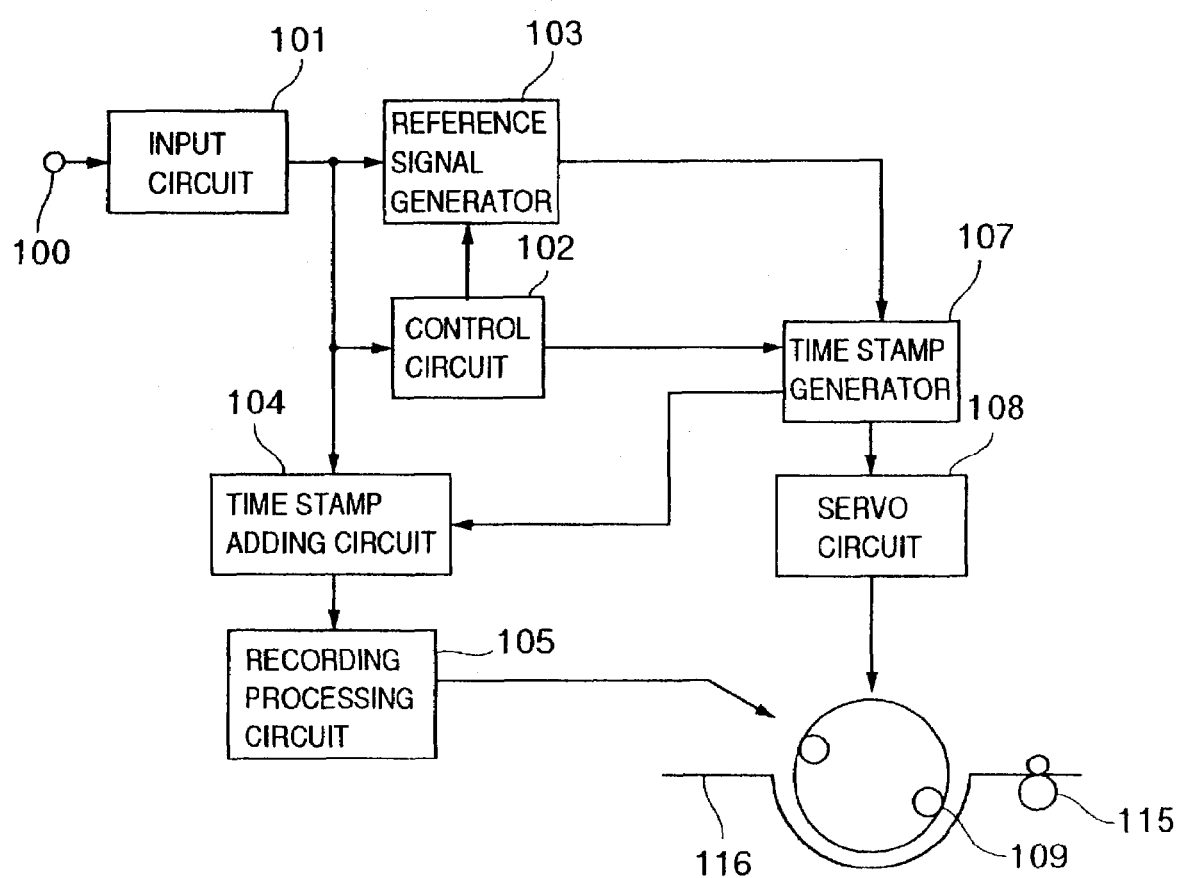
FIG. 39 is a block diagram showing a configuration of a digital signal recording apparatus including a controllable reference signal generator and a controllable time stamp generator according to another embodiment of the invention.

FIG. 39 is a block diagram showing a digital signal recording apparatus configured in such a manner that the reference signal generator and the time stamp generator can be set by the control circuit. In FIG. 39, numeral 103 designates a reference signal generator that can be controlled externally, numeral 107 a time stamp generator that can be controlled externally, and the other reference numerals designate the same component parts as those in FIG. 1, respectively.

The digital signal input to the input terminal 100 is applied through the input circuit to the control circuit 102. The control circuit 102 identifies the format of a time stamp included in the digital signal from the control signal and the like contained in the input digital signal, and sets a predetermined parameter in the reference signal generator on the basis of such information as the number of bits and the period. The reference signal generator 103 generates a reference signal in accordance with the parameter from the input digital signal. The reference signal is applied to the time stamp generator 107.

In order to add and record the time stamp desired by the user on the magnetic tape, the control circuit 102 controls the time stamp generator. The time stamp generator 107 generates a time stamp of the format set by the control circuit on the basis of the reference signal generated by the reference signal generator 103, and supplies it to the time stamp adding circuit 104. Also, a predetermined reference signal is applied to the servo circuit.

The time stamp adding circuit 104 adds the time stamp generated by the time stamp generator 107 at a predetermined position of the packet data of the input digital signal. The packet data with the time stamp added thereto is subjected to a predetermined signal processing at the recording processing circuit, and then recorded on a predetermined track on the magnetic tape using the magnetic recording head.

Although only one input terminal is used in the present embodiment, a plurality of digital broadcast receiving apparatuses can be connected at a time by using a plurality of input terminals. In such a case, the user can record a program received by an arbitrary digital broadcast receiving apparatus by switching the input as required.

Figure 22:
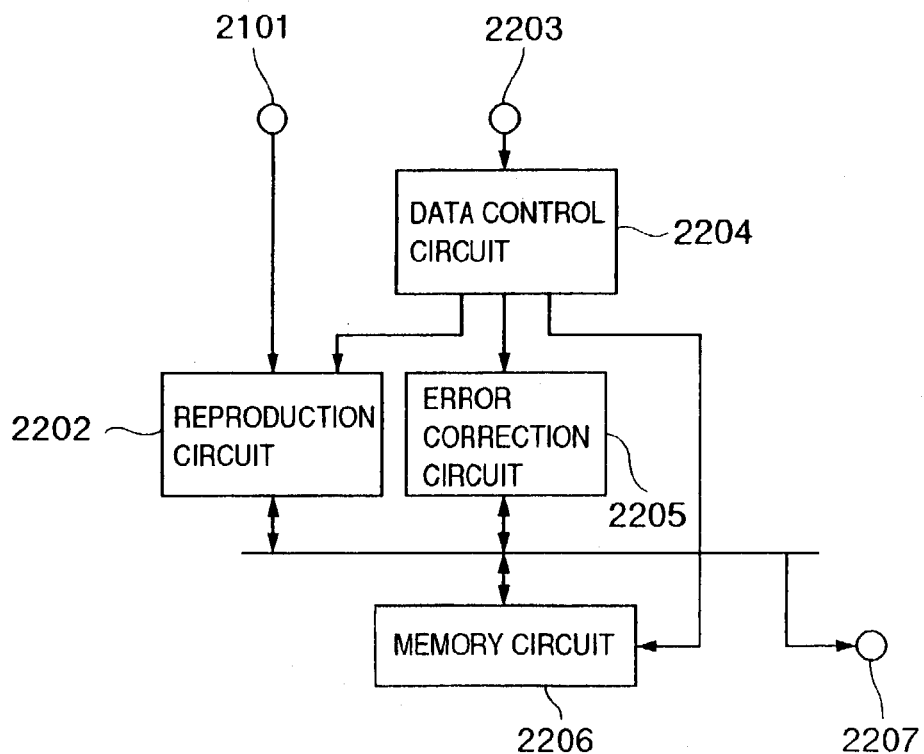
FIG. 22 is a block diagram showing a configuration of a reproduced signal processing circuit 113.

FIG. 22 is a block diagram showing a reproduction processing circuit according to an embodiment. Numeral 2201 designates a reproduced signal input terminal supplied with the signal reproduced by the rotary magnetic heads, numeral 2202 a reproducing circuit for detecting the reproduced signal, numeral 2203 an input terminal supplied with the time stamp, numeral 2204 a data control circuit for controlling the reproducing circuit, the error correction circuit and the memory circuit, numeral 2205 an error correction circuit for correcting an error, numeral 2206 a memory circuit for storing the data, and numeral 2207 a data output terminal.

The reproduction processing circuit 113 and the recording processing circuit 105 have a similar configuration, and are not used at the same time. Therefore, these two circuits may be configured of a common circuit the operation of which can be switched by the control circuit 102.

Figure 23:
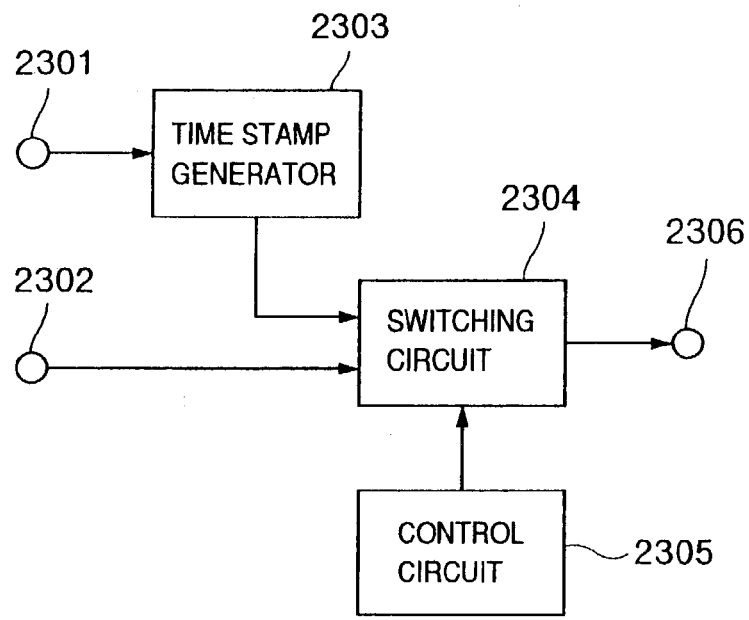
FIG. 23 is a block diagram showing a configuration of a time stamp conversion circuit 112.

FIG. 23 is a block diagram showing the time stamp conversion circuit 112 according to an embodiment. Numeral 2301 designates a reference signal input terminal supplied with a reference signal, numeral 2302 an input terminal supplied with the packet data output from the reproduced signal processing circuit 113, numeral 2303 a time stamp generator for generating a time stamp on the basis of the reference signal, numeral 2304 a switching circuit for switching the packet data and the time stamp generated by the time stamp generator, numeral 2305 a control circuit for controlling the switching circuit, and numeral 2306 an output terminal for outputting the packet data.

Figure 24:
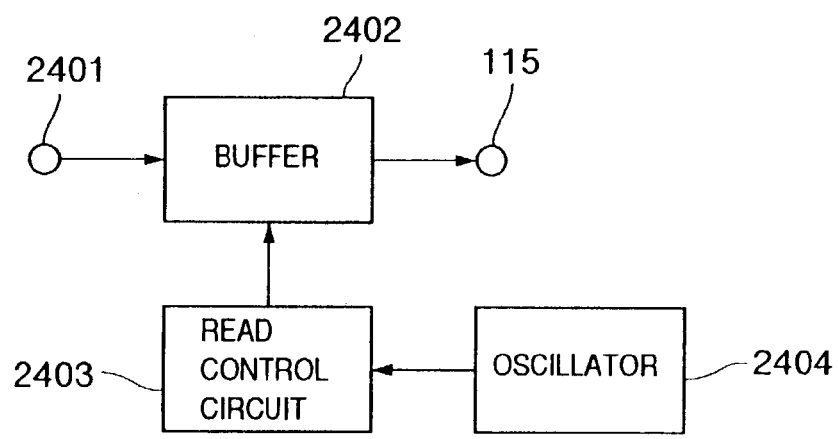
FIG. 24 is a block diagram showing a configuration of an output circuit 111.

FIG. 24 is a block diagram showing an output circuit 111 according to an embodiment. Numeral 2401 designates an input terminal supplied with the output of the time stamp generator 112, numeral 2402 a buffer memory for temporarily storing the input packet, numeral 2403 a read control circuit for controlling the operation of reading the buffer memory, numeral 2404 an oscillator and numeral 115 an output terminal.

Now, the reproducing operation will be explained with reference to FIGS. 22 to 24.

At the time of reproduction, first, the reproducing operation is performed in an arbitrary reproduction mode, so that the ID information is detected by the reproduced signal processing circuit 113. The control circuit 102 determines the recording mode on the magnetic tape and the type of the time stamp added on the basis of the ID information, and sets anew the operation mode of the reproduced signal processing circuit 113 and the servo circuit 108.

The switching circuit 106 is turned to b side by the control circuit 102, and the signal generated by the oscillator 110 is applied as a reference signal to the time stamp generator 107. The time stamp generator 107 divides the frequency of the reference signal, generates a sync signal of a predetermined frame frequency, and applies it to the servo circuit 108. Also, the time stamp generator 107 divides the frequency of the reference signal at a predetermined frequency-dividing ratio in accordance with the setting, and outputs the resulting signal as a time stamp. For example, the count value representing the 225225 periods and the count value of the 8 high-order bits are output as the 18 low-order bits.

The servo circuit 108 is for adjusting the running phase of the capstan 115 and the rotational speed and the phase of the rotary magnetic heads 19 in synchronism with the sync signal, and controls the rotary magnetic heads 109 in such a manner as to scan a predetermined recording track on the magnetic tape 116.

The signal reproduced by the rotary magnetic heads 109 is applied to the input terminal 2201 of the reproduced signal processing circuit 113 and then to the reproducing circuit 2202. The reproducing circuit 2202 detects the sync signal, detects the data in the reproduced signal and stores the data in the memory circuit 2206. After that, the error is corrected by the error correction circuit 2205.

The data control circuit 2204 compares the time stamp included in the data of each packet stored in the memory circuit 2206 with the time stamp input from the time stamp generator 107 through the point 2203, and when both are coincidental with each other, produces packet data. As a result of this processing, the packet data are output at the same timing as the data packet input timing at the time of recording. The track number of the reproduced signal may be displaced from the track information of the 8 high-order bits generated by the time stamp generator 107 due to the delay of the signal processing operation. In such a case, the output timing can be determined by comparing only 19 low-order bits except for the 7 high-order bits corresponding to the track number. And only the low-order 19 bits out of the 26-bit time stamp except for the 7 high-order bits corresponding to the track number are compared, thereby to determine the output timing. Also, comparison can be made in such a manner as to correct the track displacement. As a result of the above-mentioned processing, the packet data are output through the output terminal 2207 to the time stamp conversion circuit 112 at a predetermined timing. Setting the packet data to the same output timing is not necessarily essential, but the timing can be set not in the reproduction processing circuit 113 but in the output circuit 111.

The output from the output terminal 2207 is used for identifying the reproduced block information 33 and the flag added at the time of error correction, etc., and includes only effective packets that have been reproduced without any error, while the packets whose error cannot be corrected are not output. As a result, abnormal data can be prevented from being output.

Figure 28:
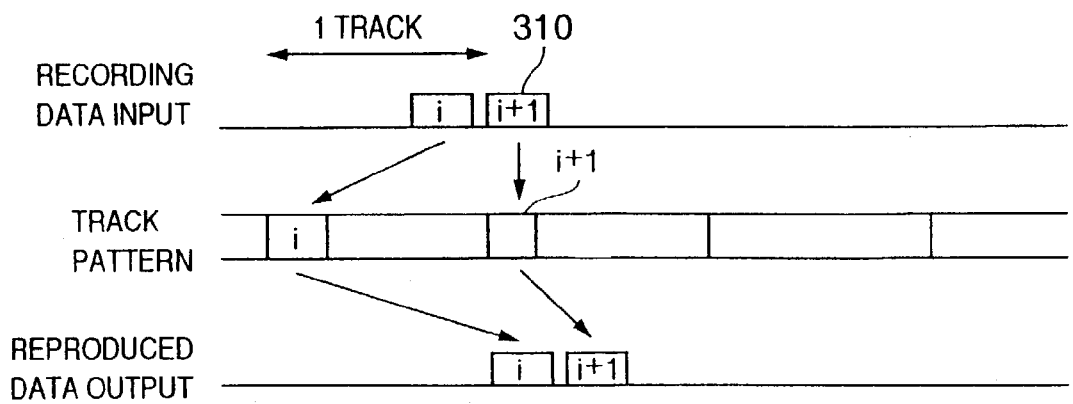
FIG. 28 is a diagram showing an example of the recording and reproduction timing.

FIG. 28 is a timing chart showing the timing of storing the reproduced data, correcting the error and outputting the data stored in the memory circuit 206 at the time of reproduction. In the shown case, the data are expressed in units of 6 tracks. The data with the error thereof corrected starts to be output upon the lapse of a time corresponding to one track after the processing. Then, as shown in FIG. 28, even in the case where adjacently input packets are recorded in the leading portion of a different track by the front-packing processing, the reproducing operation is possible with the same intervals as the recording operation. Further, as shown in FIG. 15, once information is recorded capable of identifying an unused area and the particular information is detected at the time of reproduction, for example, the data of the next track can be output without checking all the whole track data, thereby facilitating the processing. The data can of course be produced after the lapse of one track or more. The longer the waiting time, the more various recording patterns be accommodated. A larger capacity of the memory circuit 2206, however, is required.

The packet data output from the reproduction processing circuit 113 are applied to the input terminal 2302.

The reference signal input terminal 2301, on the other hand, is supplied with a reference signal generated by the oscillator. The time stamp generator 2303 generates a time stamp on the basis of this reference signal. The time stamp generator 2303 also generates a time stamp independent of the packet data input to the input terminal. Also, the format of the time stamp corresponds to the devices connected to the output of the reproduction apparatus according to the invention. Such a format is not required to be the same as those attached to the packet data generated from the recording medium.

The control circuit 2305 turns the switching circuit 2304 at a position including the time stamp in the packet data, and replaces the time stamp in the same packet data with the time stamp generated by the time stamp generator 2303.

The packet data applied to the input terminal is sent by the reproduction processing circuit 113 at the same timing as when input at the time of recording. The time stamp for the recording operation can be realized again by adding the time stamp conforming to the above-mentioned timing.

The output circuit 111 outputs the packet data with the replacement time stamp in synchronism with the clock generated by the oscillator 2404. The packet input by way of the input terminal 2401 is stored in the buffer 2402 at the rate of, say, 27 Mbps (3.375 Mbytes/sec). The packet is read from the buffer 2402 at the rate of 49.152 Mbps, for example, by the clock generated from the oscillator 2404, and output at the timing shown in FIG. 28, i.e., at the same timing as when the recording data is input. As a result, a decoder of the digital compressed video signal, a digital signal recording and reproduction apparatus or the like device for receiving and processing a reproduced packet can directly process the signal after recording and reproduction in the same manner as if it processes the signal before recording.

Figure 36:
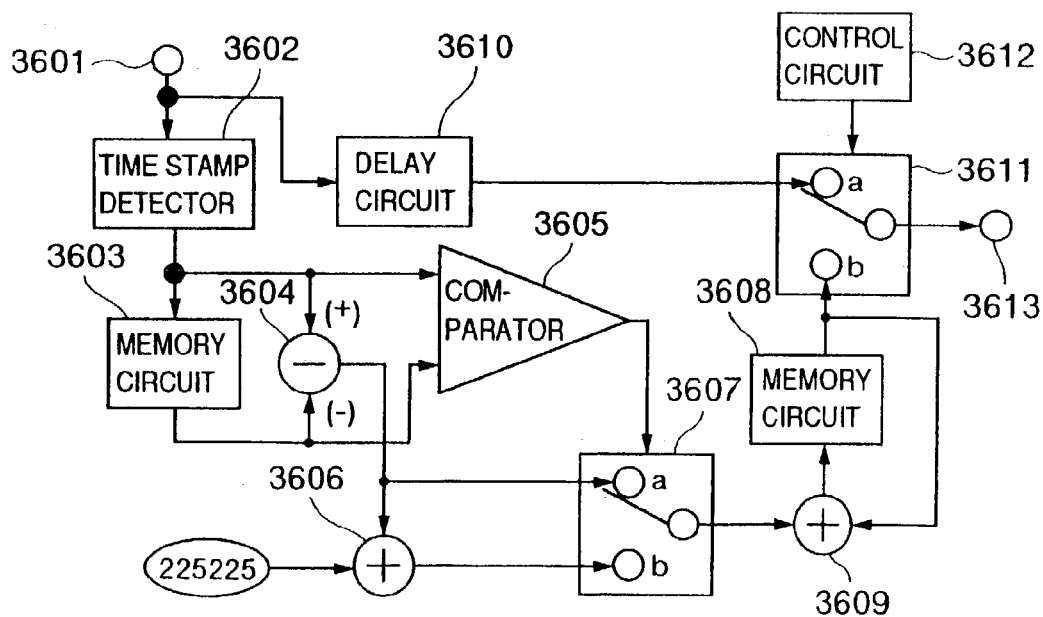
FIG. 36 is a block diagram showing another configuration of the time stamp conversion circuit 112.

FIG. 36 is a block diagram showing a time stamp conversion circuit according to another embodiment. Numeral 3601 designates a data input terminal supplied with data output from the reproduction processing circuit, numeral 3602 a time stamp detector for detecting the time stamp from the data input thereto, numeral 3603 a memory circuit for storing the time stamp, numeral 3604 a subtractor for subtracting the time stamp stored in the memory circuit 3603 from the time stamp detected by the time stamp detector 3602, numeral 3605 a comparator for comparing the time stamp detected by the time stamp detector 3602 with the time stamp stored in the memory circuit 3603, numeral 3606 an adder for adding 225225 to the result of the calculation made at the subtractor 3604, numeral 3607 a switching means for switching between the result of calculation at the subtractor 3604 and the result of calculation at the adder 3606 in accordance with the result of comparison at the comparator 3605, numeral 3608 a memory circuit for storing the result of calculation at an adder 3609 which adds thec output of the switching means 3607 to the data stored in the memory circuit 3608, numeral 3610 a delay circuit for delaying the input data, numeral 3611 a switching means for switching between the output of the delay circuit 3610 and the output of the memory- circuit 3608, numeral 3612 a control circuit for controlling the switching means 3611, and numeral 3613 an output terminal for producing the output of the switching means 3611.

The packet data output from the reproduction processing circuit 113 is applied to the input terminal 3601 in the time stamp conversion circuit 112. The time stamp detector 3602 detects the time stamp from the data in the packet. The data thus detected is applied to the memory circuit 3603, the subtractor 3604 and the comparator 3605. The memory circuit 3603 has stored therein the time stamp of the immediately preceding packet. The subtractor 3604 subtracts the time stamp of the immediately preceding packet stored in the memory circuit 3603 from the time stamp detected, and outputs the difference between the two time stamps. The time stamp recorded on the magnetic tape 11 and the time stamp added to the digital video signal input at the time of recording are produced on the basis of a reference having the same frequency. These two time stamps, therefore, increment at the same rate. The time stamp added to the digital video signal, however, is produced using a 20-bit counter, for example, whereas the time stamp of the packet recorded in the magnetic tape 117 according to the present embodiment is synchronous with the rotation of the rotary magnetic heads and is generated by the time stamp generator 107. In the broadcast system of 29.97 Hz in frame frequency, therefore, the time stamp according to the embodiment is reset and interrupted at the count 225225. This time stamp thus is required to be converted into a predetermined time stamp corresponding to the digital broadcast receiving apparatus.

The comparator compares the time stamp detected by the time stamp detector 3602 with the time stamp of the immediately preceding packet stored in the memory circuit 3603. In the case where the time stamp detected by the time stamp detector 3602 is smaller than the time stamp of the immediately preceding packet stored in the memory circuit 3603, the counter having a period of 225225 is found to be reset. Thus, 225225 is added for correction. Specifically, in the case where the time stamp detected by the time stamp detector 3602 is found smaller than the time stamp of the immediately preceding packet stored in the memory circuit 3603 from the output of the comparator 3605, the switching means 3607 is switched. Then the sum of the output of the subtractor 3604 and 225225 produced by the adder 3607 is applied as a difference to the adder circuit 3609. Otherwise, the output of the subtractor circuit 3604 is directly applied to the adder circuit 3609.

The adder circuit 3609 adds the output of the switching means 3606 to the data stored in the memory circuit 3608 thereby to calculate a time stamp. The memory circuit stores anew the result of calculation at the adder 3609, and outputs the time stamp to the switching means 3611. The memory circuit 3608 has a storage capacity of 20 bits equivalent to the time stamp added to the packet of the digital video signal input at the time of recording. As a consequence, it is possible to generate the same 20-bit continuous time stamp as the one added to the input digital video signal. A continuous time stamp can be realized by similar calculations also in an application to the digital video recording and reproduction apparatus conforming to the requirements of broadcast systems having different frame frequencies.

The delay circuit 3610 is for delaying the signal input to the input terminal 3601 by the time required for calculation of the time stamp. The control circuit 3612 controls the switching means 3611 for switching between the new calculated time stamp and the delayed data packet. The control circuit 3612 turns the switching circuit 3611 to b side at the data portion recording the time packet of the delayed data packet, and turns the switching circuit 3611 to a side at other portions. As a result, only the portion of the delayed data packet in which the time stamp is recorded is replaced by a new calculated time stamp. The data packet with the time stamp thereof replaced in this way is output to the output circuit 111 via the output terminal 3613.

Figure 34:
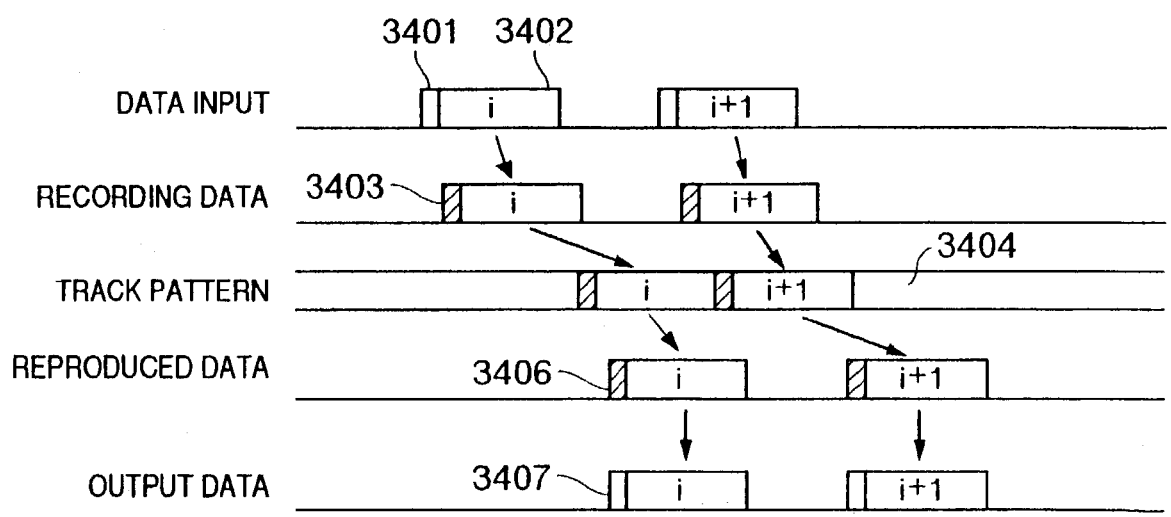
FIG. 34 is a diagram showing the relation between a replacement time stamp recorded and restored at the time of reproduction and the existing time stamp replaced by the replacement time stamp.

The above-described manner in which the time stamp is converted at the time of recording and reproduction can be summarized as shown in FIG. 34.

In FIG. 34, numeral 3401 designates a time stamp added beforehand to the packet data input, numeral 3402 a packet data, numeral 3403 a replacement time stamp added by the time stamp adding circuit 104 for recording, numeral 3404 a track pattern on the magnetic tape, numeral 3406 a time stamp reproduced, and numeral 3407 another replacement time stamp added by the time stamp conversion circuit 112 for output.

At the time of recording, the time stamp 3401 added beforehand to the input packet data is replaced by the time stamp 3403 suitable for recording by the time stamp adding circuit 104.

The data packet 3402 with the time stamp 3403 added thereto is recorded on the magnetic tape, and arranged as shown in the pattern 3404 on the track of the tape. The track pattern on the magnetic tape is reproduced as required, and output as the time stamp 3405 and the data packet 3405 at a timing corresponding to the time stamp recorded. The time stamp 3405 thus reproduced is converted into a different format by the time stamp conversion circuit, and output as the time stamp 3406 together with the data packet 3402.

According to this embodiment, the time stamp has been assumed to be added to the input digital signal in advance. In some cases, however, the time stamp is not contained in the input digital signal in advance. In the case where the input digital video signal does not contain a time stamp in advance, the reference signal generator detects a change point of the transmission clock and data and generates a signal providing a reference from the input digital signal. This is a basic technique for the data transmission and is well known.

Further, in the case where the packet data is required to be output without any time stamp added thereto, the data portion containing the time stamp can be removed by a switching circuit or a similar time stamp removing means before being output.

Figure 35:
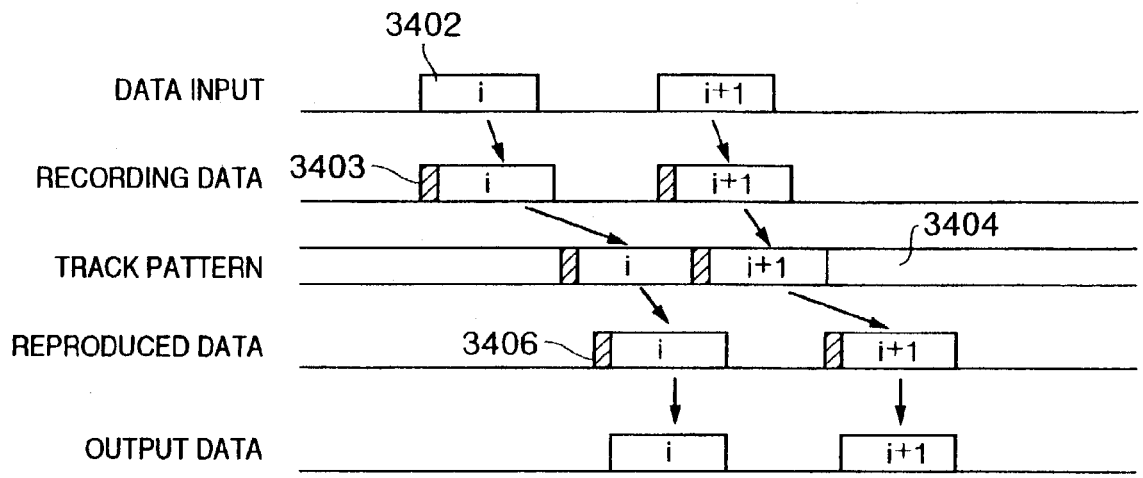
FIG. 35 is a diagram showing the manner in which a time stamp is added at the time of recording and removed at the time of reproduction.

The manner in which the time stamp is replaced in such a case is shown in FIG. 35.

In FIG. 35, the respective reference numerals designate like component parts as the corresponding reference numerals in FIG. 34, respectively.

Any time stamp is not added to the input packet data 3402. The time stamp 3403 is added to the packet data 3402 by the time stamp adding circuit 104, and is recorded on the magnetic tape together with the packet data. The track pattern on the magnetic tape is as shown by 3404.

At the time of reproduction, the data is reproduced with the time stamp 3405 added thereto together with the packet data. The output timing can thus be determined on the basis of this time stamp.

In output stage, the time stamp 3405 is removed by the time stamp conversion circuit 112 and only the packet data is output. As a result, even in the case where the packet is input without any time stamp added thereto in advance, the packet data can be output at the same time intervals as at the time of input.

The track pattern on the magnetic tape shown in FIG. 34 for recording the packet data with the time stamp added thereto in advance is recorded on the magnetic tape is identical to the track pattern on the magnetic tape shown in FIG. 35 for recording the packet without any time stamp added thereto in advance. The magnetic tapes for the two cases, therefore, are compatible with each other.

Although the embodiment described above has only one type of digital broadcast receiving apparatus connected to the digital signal recording apparatus, a plurality of digital broadcast receiving apparatuses may be connected with equal effect.

Figure 29:
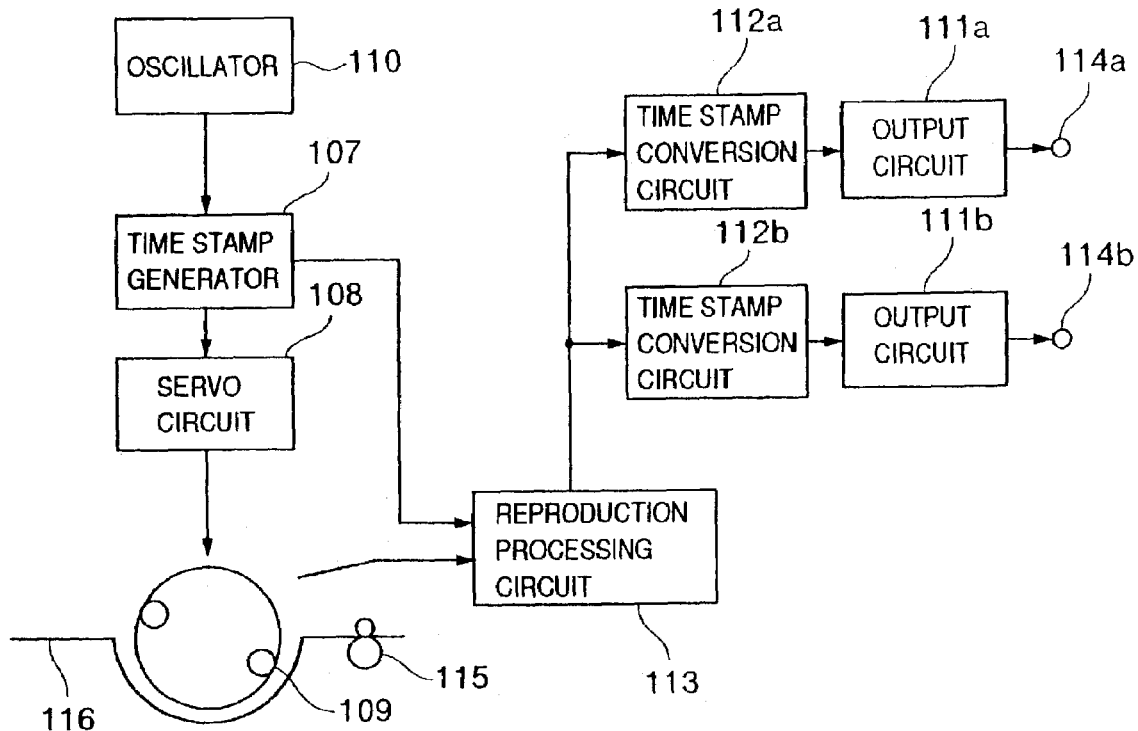
FIG. 29 is a block diagram showing a configuration of a digital signal reproduction apparatus according to an embodiment of the invention.

A plurality of digital broadcast receiving apparatuses can be so connected, for example, by providing a plurality of output terminals as in the case of the digital video signal reproduction apparatus shown in FIG. 29.

In FIG. 29, numerals 111a, 111b designate output circuits, numerals 112a, 112b time stamp conversion circuits for converting the time stamp, and numerals 114a, 114b output terminals. Other reference numerals designate the corresponding component parts of the same reference numerals in FIG. 1, respectively.

The digital video signal reproduction apparatus comprises output terminals 114a, 114b corresponding to the associated digital broadcast receiving apparatuses. The output terminals 114a and 114b are used for connecting different digital broadcast receiving apparatuses.

At the time of reproduction, the time stamp conversion circuits 112a, 112b convert the time stamp of the data reproduced from the magnetic tape into different formats of time stamp, and output them through the output circuits 111a, 111b to the output terminals 114a, 114b, respectively. The data output from one magnetic tape is output from a different terminal as a data having a different time stamp. Therefore, the reproduction operation can be performed at a plurality of digital broadcast receiving apparatuses at the same time. The user can view the contents of the magnetic tape using any one of the digital broadcast receiving apparatuses according to this requirement.

Figure 30:
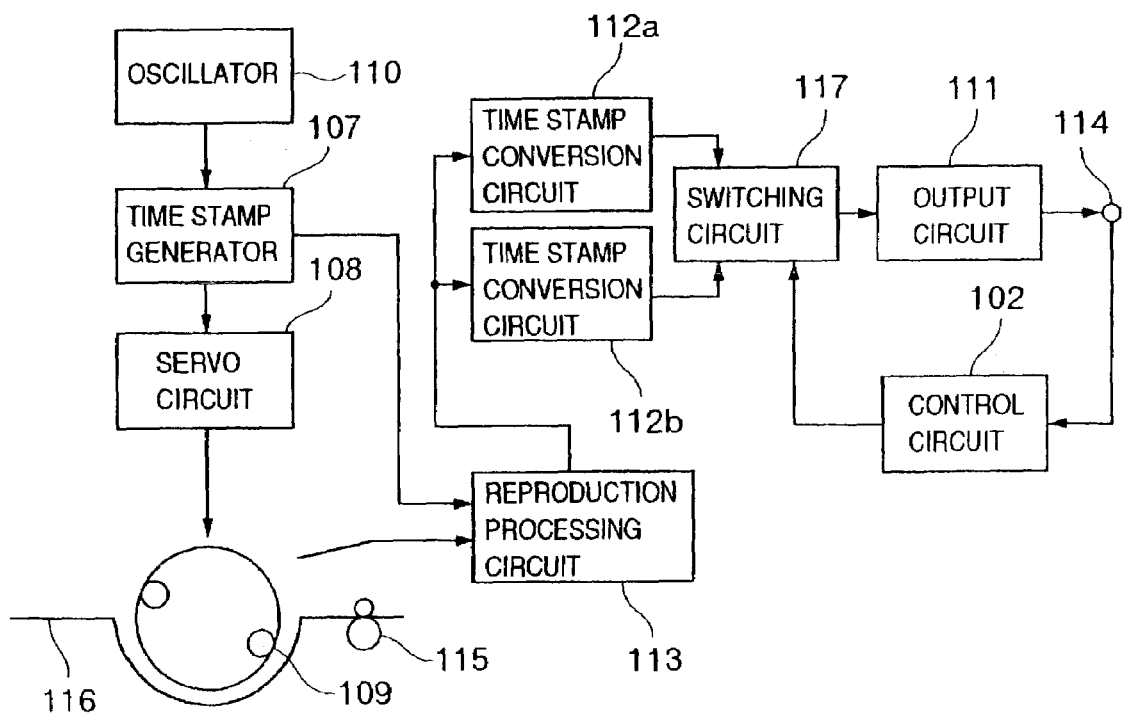
FIG. 30 is a block diagram showing a configuration of a digital signal reproduction apparatus according to another embodiment of the invention.

FIG. 30 is a block diagram showing a reproduction apparatus comprising a plurality of time stamp conversion circuits.

In FIG. 30, numeral 102 designates a control circuit for discriminating the type of the digital broadcast receiving apparatus connected to the output terminal 114, numerals 112a, 112b time stamp conversion circuits each for converting a time stamp into a time stamp of a different format, and numeral 117 a selector for selecting the output of the time stamp conversion circuit. Other reference numerals in FIG. 30 designate the same component parts having the same reference numerals in FIG. 1, respectively.

At the time of reproduction, the control circuit 102 discriminates the type of the digital broadcast receiving apparatus connected to the output terminal 114. Specifically, a predetermined data is output at the output terminal 114 for communication, and the control means 102 checks each response to the communication. In this way, the type of the digital broadcast receiving apparatus can be discriminated. The control circuit sets the switching circuit 117 in such a manner as to select the time stamp conversion circuit 112a or 112b for generating a time stamp of a format corresponding to the type of the digital broadcast receiving apparatus thus discriminated. By preparing a plurality of time stamp conversion circuits, the requirement for a plurality of digital broadcast receiving apparatuses can be accommodated.

Figure 32:
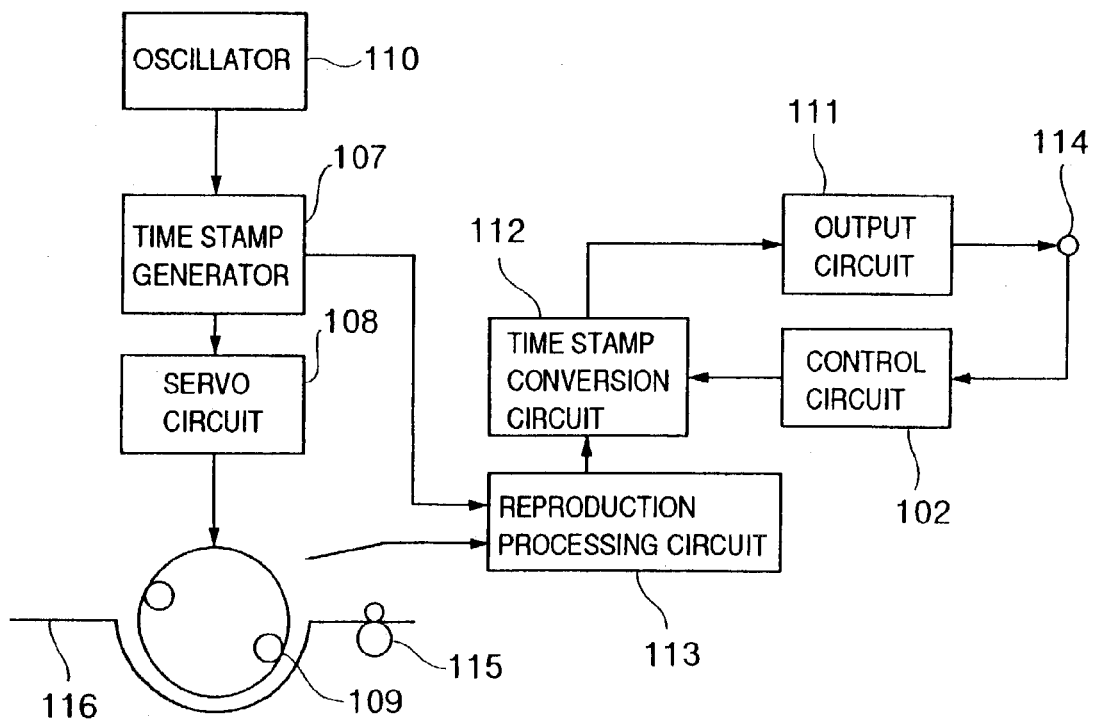
FIG. 32 is a block diagram showing a configuration of the digital signal reproduction apparatus according to another embodiment of the invention.

FIG. 32 is a block diagram showing a reproduction apparatus using a time stamp conversion circuit capable of generating a plurality of time stamp formats.

In FIG. 32, numeral 102 designates a control circuit, and numeral 112 a time stamp conversion circuit capable of changing the time stamp format through the control circuit 102. Other reference numerals in FIG. 32 designate like component parts having like reference numerals in FIG. 1, respectively.

At the time of reproduction, the control circuit 102 discriminates the type of the digital broadcast receiving apparatus connected to the output terminal 114. A specific operation of the time stamp conversion circuit is similar to that of the reproduction apparatus in FIG. 30. The control circuit sets the time stamp conversion circuit 112 in such a manner as to generate a time stamp of a format corresponding to the type of the digital broadcast receiving apparatus discriminated. Specifically, the control circuit is adapted to set the frequency of the reference clock, the number of bits of the time stamp, the maximum period of the time stamp, etc. As a result, the requirement for various types of digital broadcast receiving apparatuses can be met without providing a plurality of time stamp conversion circuits.

Also, with a configuration in which the reference signal generator 103 can be controlled by the control circuit, the requirement for a plurality of digital broadcast receiving apparatuses can be met for both input and output sides.

Apart from the output terminals, in the case where a plurality of input terminals are provided each with a reference signal generator, it is possible to input and record signals of different time stamp formats.

Figure 31:
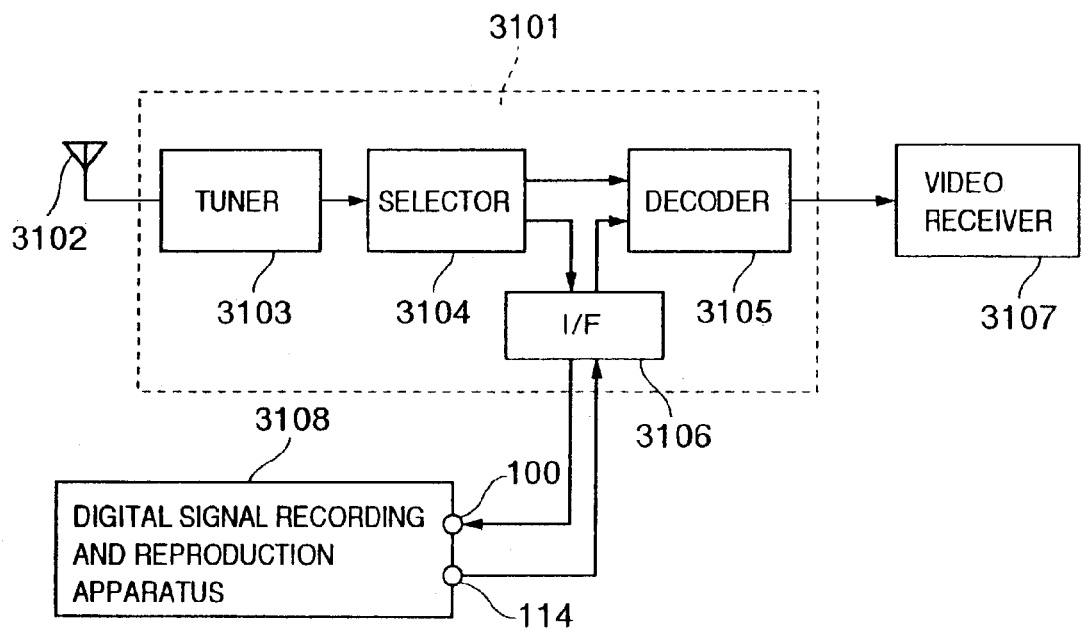
FIG. 31 is a diagram showing the connection between the digital signal recording and reproduction apparatus of FIG. 1 and a digital broadcast receiving apparatus.

FIG. 31 shows an example connection between the digital signal recording and reproduction apparatus shown in FIG. 1 and a digital broadcast receiving apparatus. Numeral 3101 designates a digital broadcast receiving apparatus, numeral 3102 an antenna, numeral 3103 a tuner, numeral 3104 a selector, numeral 3105 a decoding circuit, numeral 3106 an interface circuit, numeral 3107 a video receiver, and numeral 3108 the digital signal recording apparatus in FIG. 1.

The digital broadcast signal received through the antenna 3102 is demodulated by the tuner 3103, and is applied to the selector 3104 for selecting a required digital compressed video signal. The digital compressed video signal thus selected is decoded into a normal video signal by the decoding circuit 3105 and output to the video receiver 3107. Also, in the case where the receiving signal is scrambled or otherwise processed, the receiving signal is descrambled at the decoding circuit 3105 before the decoding operation.

At the time of normal receiving, the decoding circuit 3105 demodulates the digital compressed signal from the received signal. This digital compressed signal is decoded into a normal video signal and a normal audio signal by a decoder and output to the TV or the like. This digital compressed signal is normally transmitted in packets. The packet transmission rate varies according to the contents of broadcast. Also, the packet transmission intervals vary with the encoding process. The decoder reproduces the frame frequency for encoding and thus decodes the video signal from the information contained in the data in packet form and from the intervals at which the packets have been are transmitted.

In the case where data are recorded in the digital signal recording and reproduction apparatus 3108, the interface circuit 3106 adds a time stamp indicating the packet transmission interval to the digital compressed signal in packet form. This signal is converted and output in the format as shown in FIG. 16. The resulting signal is input through the input terminal 100 to and recorded in the digital signal recording apparatus 3108. In the case where the packets are transmitted without any time stamp added thereto, on the other hand, the time stamp can be added and recorded by the time stamp adding circuit 104 in the recording and reproduction apparatus 3108.

The digital compressed video signal and the like reproduced by the digital signal recording and reproduction apparatus 3108 are output from the output terminal 114 to the interface circuit 3106 at the same intervals as at the time of recording using the time stamp. The interface circuit 3106 processes the input signal in the same way as at the time of normal receiving, and outputs the processed signal to the video receiver 3107. The video signal and the audio signal are then decoded and output to the TV or the like.

Although different terminals are used for input and output according to this embodiment, a terminal may be shared by input and output.

The foregoing description concerns applications of the invention to a magnetic recording and reproduction apparatus for recording and reproducing data on a magnetic tape using rotary magnetic heads. The present invention, however, is not limited to the magnetic recording and reproduction apparatus but is also applicable to an apparatus for recording and reproducing digital signals on a disk such as a magneto-optical disk with equal effect. Also, the invention is of course applicable to a recording medium having no driver such as a semiconductor memory, and thus can be realizable with any recording medium.

Further, the present invention can also be applied to a digital signal processing apparatus for processing a digital signal in packet form. In such a case, the arrangement shown in, for example, FIG. 1 may not have the servo circuit 108, rotary magnetic heads 109, capstan 115 and magnetic tape 106. The recording processing circuit 105 may be constituted by a signal processing circuit for producing an output signal from the digital signal with the time stamp added thereto. The reproduction processing circuit 113 may also be constituted by a signal processing circuit.

According to the present embodiment, the time stamp added to the input digital video signal assumes a 20-bit continuous form, and the recorded time stamp assumes a 26-bit discrete form synchronous with the rotation of the rotary magnetic heads. The invention can of course be realized, however, with a time stamp with an arbitrary bit length and an arbitrary frequency. Also, in the case where a plurality of time stamp generators and a plurality of time stamp adding circuits are prepared and switched as required, a digital signal recording and reproduction-apparatus can be configured meeting the recording requirement for a plurality of time stamps. In this case, an identification signal for the added time stamp is recorded in an additional information area or the like on the magnetic tape, and the time stamp generator is controlled in accordance with the identification signal at the time of reproduction. In this way, a plurality of formats for time stamp addition can be accommodated.

It will thus be understood from the foregoing description that the digital signal recording apparatus according to the invention comprises a time stamp adding means for adding a time stamp generated by a time stamp generator to the input digital video signal in place of the time stamp already added thereto, in which any format of the time stamp added to the input digital video signal can be converted into a common format of time stamp and recorded. The compatibility of the recording format for the digital video signal recorded on the recording medium can thus be improved.

Also, the digital signal reproduction apparatus according to the invention comprises a time stamp conversion means for converting the time stamp added to the digital video signal reproduced from the recording medium into a predetermined time stamp. The reproduced signal, therefore, is output with its time stamp converted into the one corresponding to the digital broadcast receiving apparatus involved. In this way, the digital signal reproduction apparatus can be connected to an arbitrary digital broadcast receiving apparatus for the purpose of reproduction.

Further, the data can be output with the time stamp thereof converted into a predetermined format regardless of the format of the time stamp in the recording medium. As a result, recording media having data recorded with a plurality of time stamp formats can be reproduced by a single digital broadcast receiving apparatus.

What is claimed is:

1. A digital signal reproduction apparatus for reproducing a recorded digital signal from a recording medium, the recorded digital signal being recorded on the recording medium in blocks and containing a plurality of recorded packets, each of the recorded packets having a predetermined number of bytes, a time stamp having been added to each of the recorded packets in advance for indicating a time of transmission of the recorded packet, the digital signal reproduction apparatus comprising:

a time stamp generator which generates a second time stamp which is independent of the first time stamp and which indicates the same packet transmission time interval as the first time stamp, and having a different format than the first time stamp;

a time stamp adding circuit which removes the first time stamp added to each of the recorded packets in advance from each of reproduced packets of the recorded digital signal reproduced from the recording medium and adds the second time stamp to each of the reproduced packets; and an output circuit which outputs the reproduced packets having the second time stamp added thereto by the time stamp adding circuit.

2. A digital signal reproduction apparatus according to claim 1, wherein the recorded digital signal reproduced from the recording medium includes an error correction code; and wherein the digital signal reproduction apparatus further comprises an error correction circuit which corrects an error of the recorded digital signal reproduced from the recording medium using the error correction code.

3. A digital signal reproduction apparatus according to claim 1, further comprising:

a second time stamp generator which generates a third time stamp;

a comparator which compares the third time stamp generated by the second time stamp generator with the first time stamp of each of the reproduced packets; and a reproduction circuit which outputs data of each of the reproduced packets in a case where the first time stamp of each of the reproduced packets coincides with the third time stamp generated by the second time stamp generator.

4. A digital signal reproduction method for reproducing a recorded digital signal from a recording medium, the recorded digital signal being recorded on the recording medium in blocks and containing a plurality of recorded packets, each of the recorded packets having a predetermined number of bytes, a first time stamp having been added to each of the recorded packets in advance for indicating a time of transmission of the recorded packet, the digital signal reproduction method comprising the steps of:

generating a second time stamp which is independent of the first time stamp and which indicates the same packet transmission time interval as the first time stamp, with the second time stamp having a different format than the first time stamp;

removing the first time stamp added to each of the recorded packets in advance from each of reproduced packets of the recorded digital signal reproduced from the recording medium and adding the second time stamp to each of the reproduced packets; and outputting the reproduced packets having the second time stamp added thereto.

5. A digital signal reproduction apparatus for reproducing a recorded digital signal from a recording medium, the recorded digital signal being recorded on the recording medium in blocks and containing a plurality of recorded packets, each of the recorded packets having a predetermined number of bytes, a recorder time stamp having been added to each of the recorded packets at a time of recording for indicating a time of transmission of the recorded packet, the digital signal reproduction apparatus comprising:

a reproduction time stamp generator which generates a reproduction time stamp at a time of reproduction, wherein the reproduction time stamp is a converted version of the recorder time stamp and indicates the same packet transmission time interval as the first time stamp, and has a different format than the recorder time stamp;

a time stamp adding circuit which removes the recorder time stamp from each of reproduced packets of the recorded digital signal reproduced from the recording medium, and adds the reproduction time stamp to each of the reproduced packets; and an output circuit which outputs the reproduced packets having the reproduction time stamp added thereto by the time stamp adding circuit.

6. A digital signal reproduction apparatus according to claim 5, wherein the recorded digital signal reproduced from the recording medium includes an error correction code; and wherein the digital signal reproduction apparatus comprises an error correction circuit which corrects an error of the recorded digital signal reproduced from the recording medium using the error correction code.

7. A digital signal reproduction apparatus according to claim 5, comprising:

a second reproduction time stamp generator which generates a second reproduction time stamp;

a comparator which compares the second reproduction time stamp generated by the second reproduction time stamp generator with the recorder time stamp of each of the reproduced packets; and a reproduction circuit which outputs data of each of the reproduced packets in a case where the recorder time stamp of each of the reproduced packets coincides with the second reproduction time stamp generated by the second reproduction time stamp generator.

8. A digital signal reproduction method for reproducing a recorded digital signal from a recording medium, the recorded digital signal being recorded on the recording medium in blocks and containing a plurality of recorded packets, each of the recorded packets having a predetermined number of bytes, a recorder time stamp generated at a time of recording having been added to each of the recorded packets for indicating a time of transmission of the recorded packet, the digital signal reproduction method comprising:

generating a reproduction time stamp at a time of reproduction, wherein the reproduction time stamp is a converted version of the recorder time stamp and indicates the same packet transmission time interval as the first time stamp, and has a different format than the recorder time stamp;

removing the recorder time stamp from each of reproduced packets of the recorded digital signal reproduced from the recording medium and adding the reproduction time stamp to each of the reproduced packets; and outputting the reproduced packets having the reproduction time stamp added thereto.

* * * * *